(12) United States Patent
Bladen et al.

(10) Patent No.: US 9,626,536 B2
(45) Date of Patent: Apr. 18, 2017

(54) IDENTIFICATION TAGS AND THEIR MANUFACTURE

(71) Applicant: TAGAM LIMITED, Auckland (NZ)

(72) Inventors: Roy Victor Bladen, Auckland (NZ); Michael Stuart Gardner, Auckland (NZ)

(73) Assignee: DATAMARS SA, Bedano-Lugano (CH)

( * ) Notice: Subject to any disclaimer, the term of this patent is extended or adjusted under 35 U.S.C. 154(b) by 0 days.

(21) Appl. No.: 14/428,482

(22) PCT Filed: Sep. 4, 2013

(86) PCT No.: PCT/NZ2013/000156
§ 371 (c)(1),
(2) Date: Mar. 16, 2015

(87) PCT Pub. No.: WO2014/042540
PCT Pub. Date: Mar. 20, 2014

(65) Prior Publication Data
US 2015/0242661 A1  Aug. 27, 2015

(30) Foreign Application Priority Data

Sep. 14, 2012 (NZ) ........................................ 602440
Jan. 23, 2013 (NZ) ........................................ 606165

(51) Int. Cl.
*G09F 3/00* (2006.01)
*G06K 7/10* (2006.01)
(Continued)

(52) U.S. Cl.
CPC ........ *G06K 7/10009* (2013.01); *A01K 11/004* (2013.01); *B29C 45/14008* (2013.01);
(Continued)

(58) Field of Classification Search
CPC .. G09F 3/00; G06K 7/10; B29C 45/14; A10K 11/00
(Continued)

(56) References Cited

U.S. PATENT DOCUMENTS 4,635,389 A * 1/1987 Oudelette ............ A01K 11/001
40/301
4,653,208 A * 3/1987 Wassilieff ............ A01K 11/003
40/301

(Continued)

FOREIGN PATENT DOCUMENTS

| GB | 2294664 | 5/1996 |
| NZ | 236752 | 5/1993 |
| NZ | 504742 | 11/2001 |

*Primary Examiner* — Nam V Nguyen
(74) *Attorney, Agent, or Firm* — Duane Morris LLP; J. Rodman Steele, Jr.; Gregory M. Lefkowitz

(57) ABSTRACT

In FIG. 9 a female identification tag is formed by overmolding between mold parts (8, 9) a base section (1) which will include inwardly directed projections or fingers (4) to retain in use the head of a male tag and may include an RFID coil (6). As the mold parts (8,9) separate, the core (10) can start to eject, moving through the flexible opening (13) formed at the top of the soft boss (12) of the tag. Subsequently, a hard insert can close off the opening (13) in providing tamperproofing. The core (10) can be caused to rotate as it moves through the flexible opening (13) in order to break any bond between the plastics material and the core (10).

16 Claims, 32 Drawing Sheets

(51) Int. Cl.
    *B29C 45/14* (2006.01)
    *A01K 11/00* (2006.01)
    *G09F 3/16* (2006.01)
    *G09F 3/20* (2006.01)
    *B29L 7/00* (2006.01)
    *B29K 75/00* (2006.01)
    *B29K 105/00* (2006.01)
    *B29L 31/34* (2006.01)

(52) U.S. Cl.
    CPC .. B29C 45/14065 (2013.01); B29C 45/14754 (2013.01); B29C 45/14819 (2013.01); G09F 3/16 (2013.01); G09F 3/207 (2013.01); *B29C 2045/14147* (2013.01); *B29K 2075/00* (2013.01); *B29K 2105/253* (2013.01); *B29K 2995/0003* (2013.01); *B29L 2007/004* (2013.01); *B29L 2031/3456* (2013.01); *B29L 2031/3481* (2013.01)

(58) Field of Classification Search
    USPC .............. 340/572.1; 40/301, 668; 24/704.1
    See application file for complete search history.

(56) References Cited

U.S. PATENT DOCUMENTS

| | | | | |
|---|---|---|---|---|
| 4,694,781 A * | 9/1987 | Howe | ................ | A01K 13/003 119/655 |
| 4,953,313 A * | 9/1990 | Scott | ................ | G09F 3/12 40/301 |
| 5,016,368 A | 5/1991 | Cassata | | |
| 5,189,986 A * | 3/1993 | Burkoth | ................ | A01K 11/001 119/655 |
| 5,461,805 A * | 10/1995 | Johnson | ................ | A01K 11/001 119/814 |
| 5,588,234 A * | 12/1996 | de Jong | ................ | A01K 11/004 40/301 |
| 5,667,515 A * | 9/1997 | Chu | ................ | G09F 3/12 40/300 |
| 5,725,261 A * | 3/1998 | Rahn | ................ | A01K 11/001 292/307 R |
| 5,768,813 A | 6/1998 | Reboul et al. | | |
| 6,098,324 A * | 8/2000 | Nepote | ................ | A01K 11/004 40/300 |
| 6,145,225 A * | 11/2000 | Ritchey | ................ | A01K 11/002 40/300 |
| 6,497,062 B1 * | 12/2002 | Koopman | ................ | A01K 11/004 40/301 |
| 6,501,430 B1 * | 12/2002 | Esselink | ................ | A01K 11/004 340/572.1 |
| 6,666,170 B1 * | 12/2003 | Hilpert | ................ | A01K 11/001 119/814 |
| 6,708,432 B2 * | 3/2004 | Haar | ................ | A01K 11/001 40/301 |
| 7,726,055 B2 * | 6/2010 | Costantini | ................ | A01K 11/004 24/704.1 |
| 7,895,776 B2 * | 3/2011 | Costantini | ................ | A01K 11/001 40/301 |
| 9,038,293 B2 * | 5/2015 | Decaluwe | ................ | A01K 11/004 119/859 |
| 2011/0000111 A1 * | 1/2011 | Hilpert | ................ | A01K 11/001 40/301 |

* cited by examiner

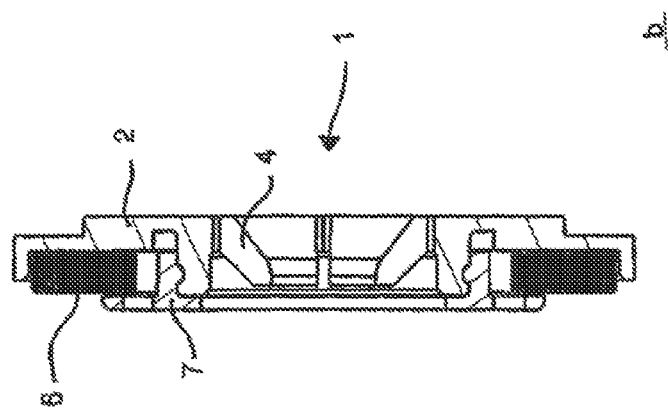
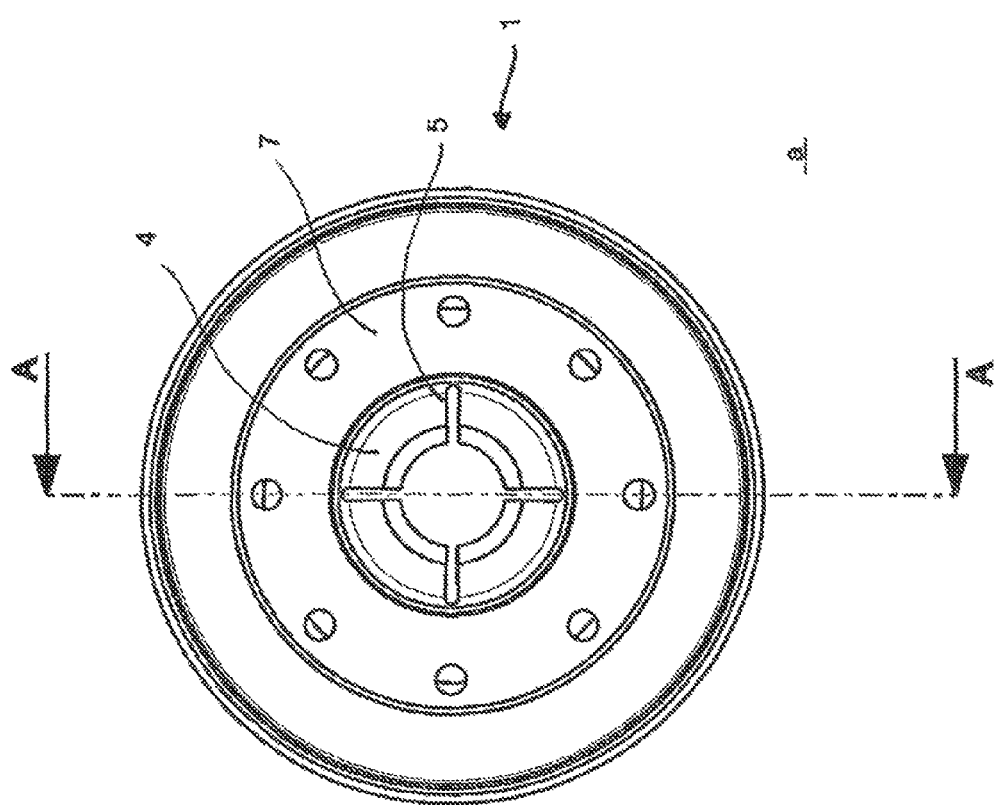
Figure 1

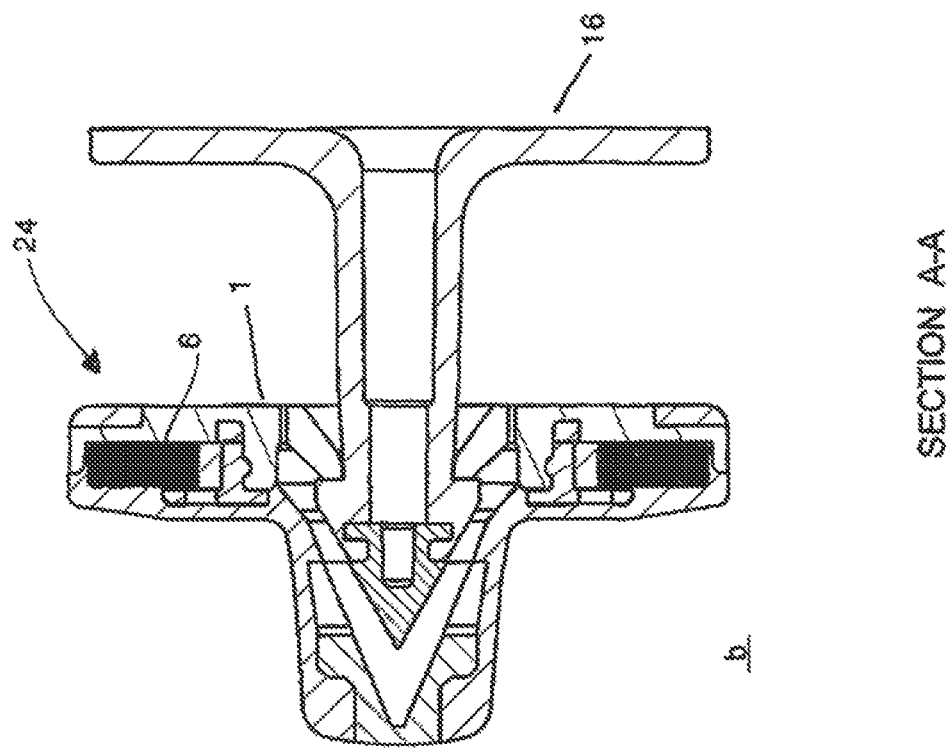
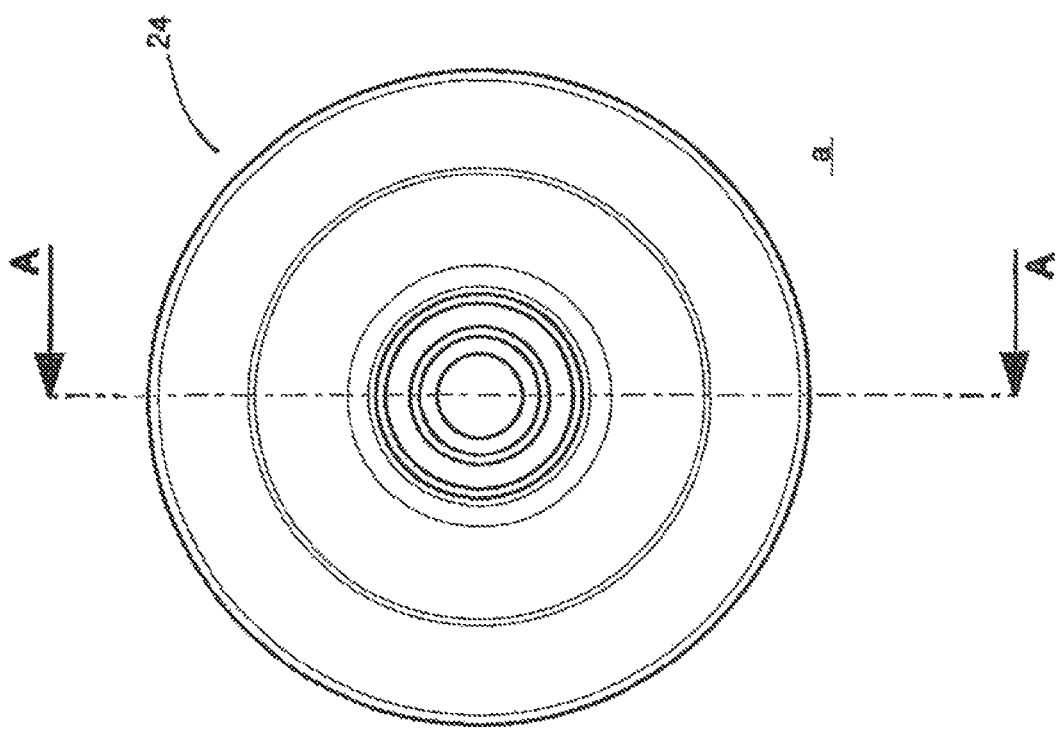
Figure 22

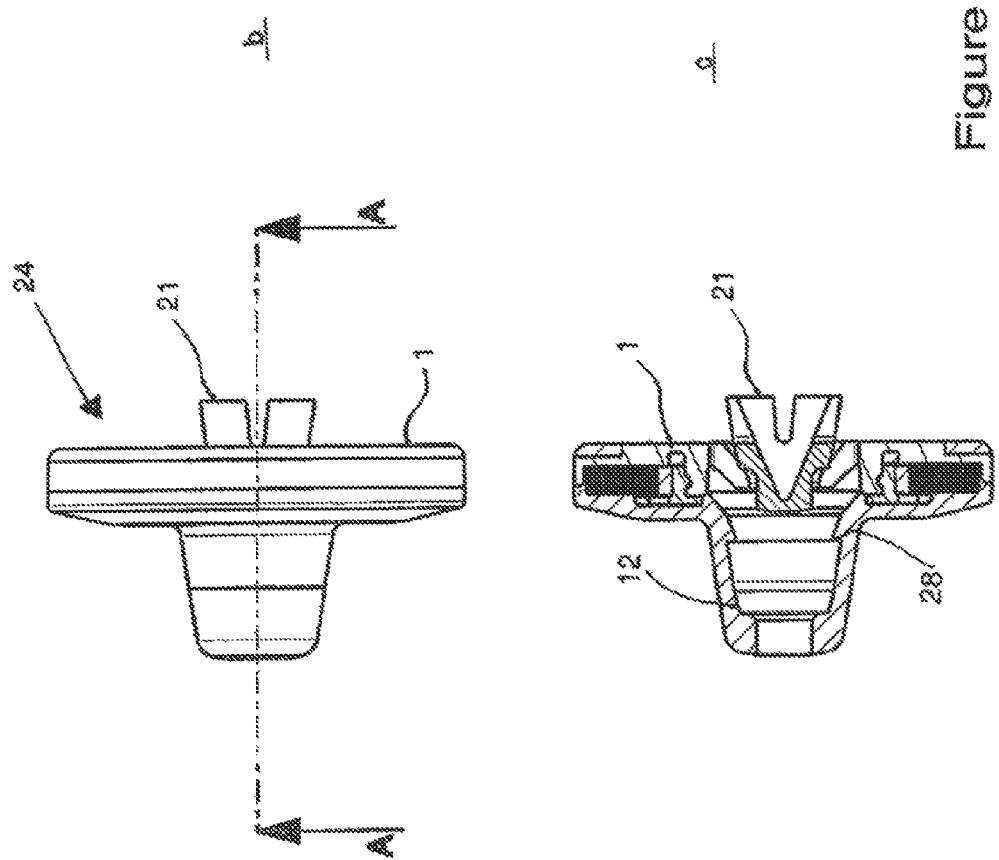

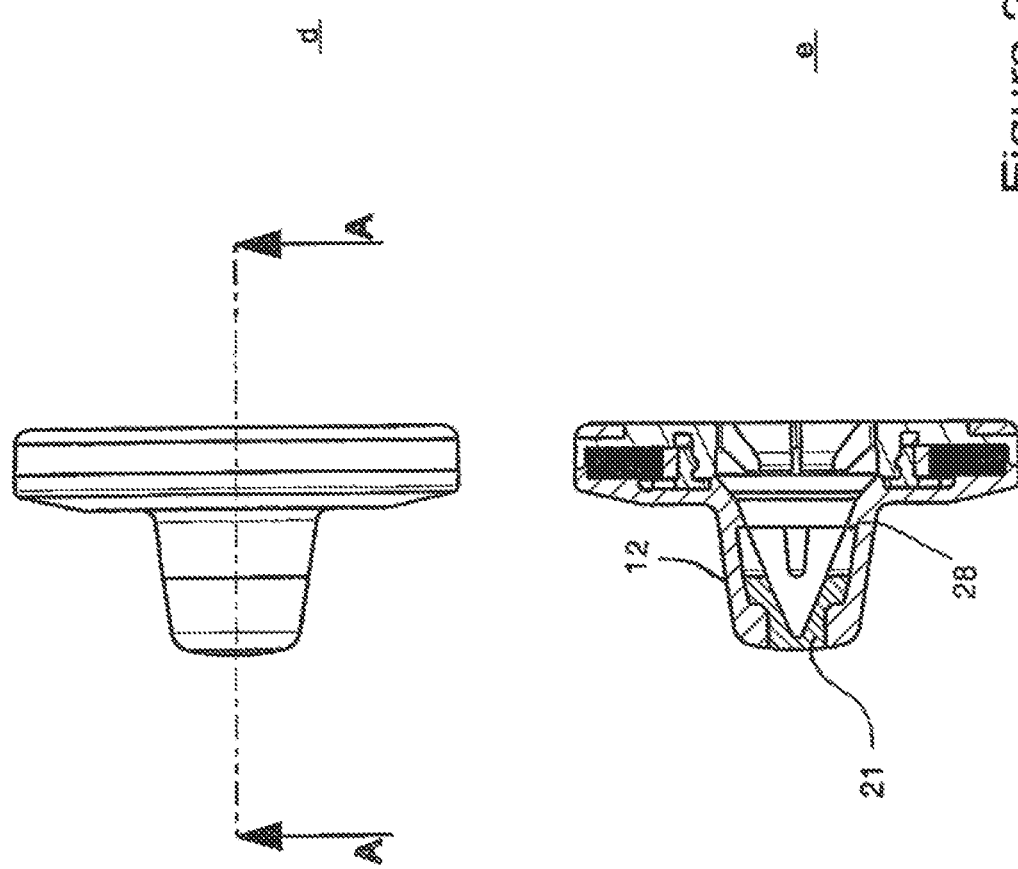

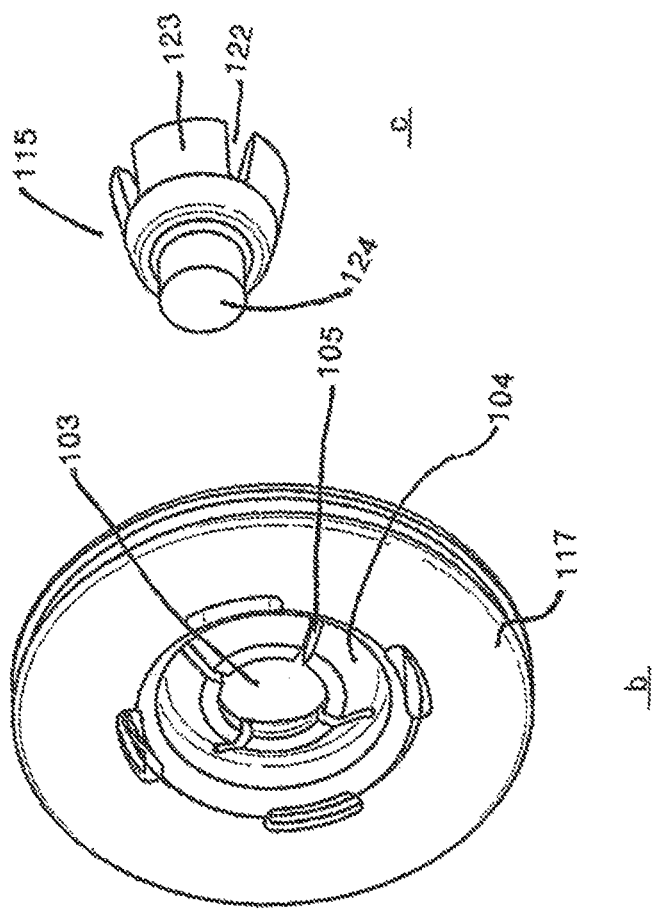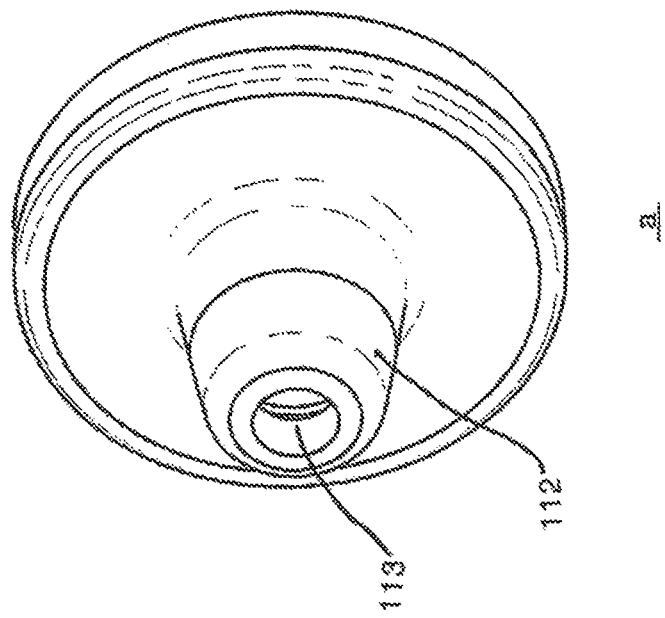
Figure 28

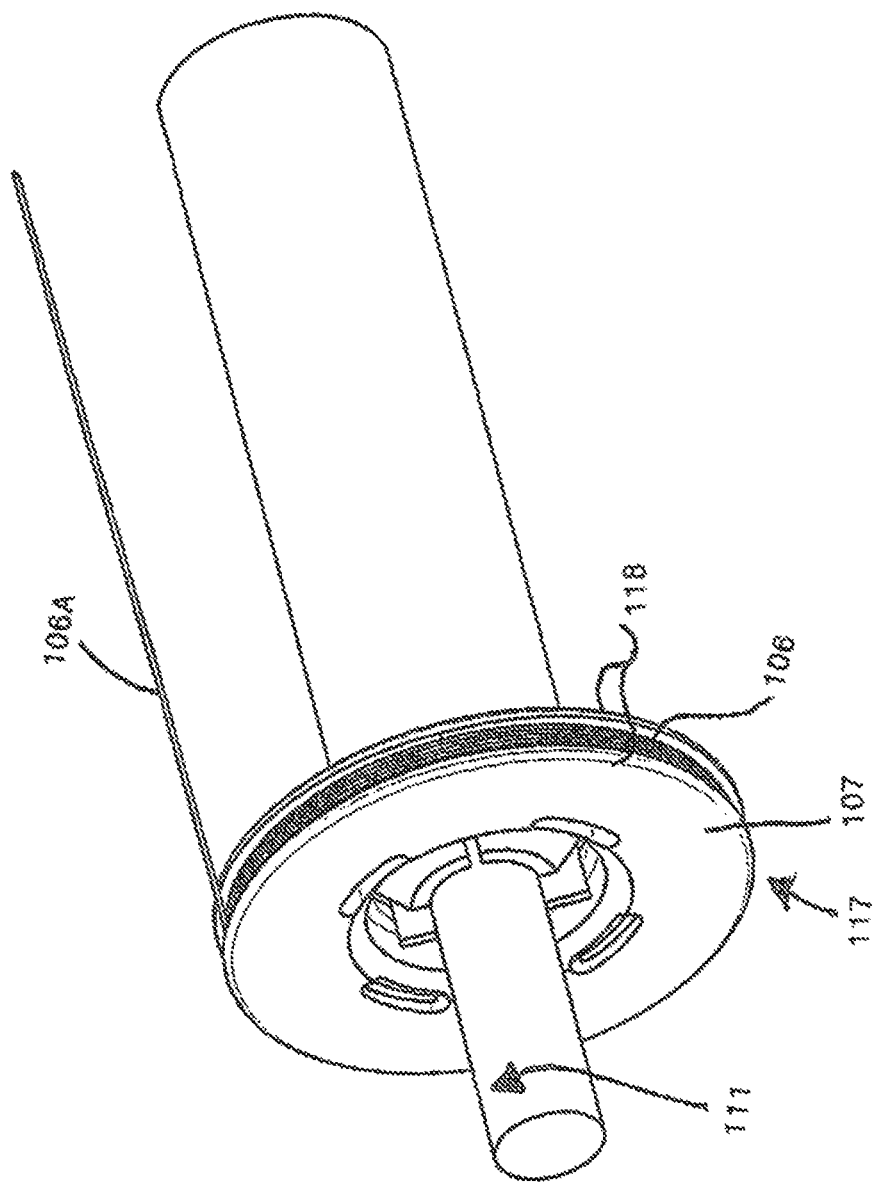

IDENTIFICATION TAGS AND THEIR MANUFACTURE

CROSS-REFERENCE TO RELATED APPLICATIONS

This application is a §371 national stage entry of International Application No. PCT/NZ2013/000156, filed Sep. 4, 2013, which claims priority to New Zealand Patent Application No. 602440, filed Sep. 14, 2012, and New Zealand Patent Application No. 606165 filed Jan. 23, 2013, the entire contents of which are incorporated herein by reference.

BACKGROUND OF INVENTION

This invention relates to identification tags and their manufacture. More especially, female identification tags.

The present invention will be described particularly in respect of an overmoulded animal female identification tag but it is to be understood that the invention has application for a wide variety of identification tags.

When a male tag engages with a female tag, it is important that the engagement is secure so that the tags are not readily detached, either accidentally, or intentionally for some fraudulent purpose.

To facilitate that secure engagement, various past proposals have been made. For example, in New Zealand patent 504742 (Allflex) the female tag includes a female opening with a plurality of projections directed inwardly of a hard boss, of which the opening forms part, so that the male head, after entry into the female opening, is retained by the projections or "fingers". A problem with that proposal is that the female flag is tied to the hard boss only in a small area around the edge of the female opening.

Another proposal, in New Zealand patent 236752 (Stafford et al.), provides a female opening in the form of a domed split washer of resilient material, the outer peripheral edge of the washer being embedded in the soft plastics of the outer boss and female flag. That proposal, the manner of manufacture of which is unclear, has no provision for the inclusion of a hard material to protect the male head after insertion into the female tag in order to make the tag more tamper proof.

The present invention proposes the use of a female tag base section, including projections or "fingers", such as in Allflex referred to above. A major advantage of such fingers is that they enable the tag to be used in very cold environments, including sub-zero temperatures. A continuous female opening would, in such temperatures, resist the entry of the male head. It is to be appreciated that where the term "projections" or "fingers" is used in the present specification, it is intended to encompass all suitable designs for this purpose, including the presence of existing slots or gaps between discrete projections, or lines of weakness or perforations which would be able to fracture on the entry of the male head.

It is thus an object of a preferred embodiment of the invention to provide a method of manufacture of a female identification tag and/or tags manufactured thereby, which will overcome, or alleviate, problems in such manufacture or tags to date, or which at least will provide the public with a useful choice.

Further objects of the invention in all its embodiments will become apparent from the following description.

SUMMARY OF THE INVENTION

According to one aspect of the present invention, a method of manufacture of a female identification tag includes:

i. positioning within an open moulding tool a female base section including an opening with inwardly directed projections;
ii. closing the moulding tool and its core over the female base section to define areas for overmoulding;
iii. filling the defined areas with the overmoulding material so as to include the formation of a boss as part of a female tag;
iv. opening the moulding tool and provide for its core to move through an upper opening formed in the boss; and
v. ejecting the female tag from the open tool.

Optionally the female base section and an RFID component in the above method are provided as a single unit.

According to a further aspect of the present invention, a female identification tag includes a female base section having an opening with a plurality of inwardly directed projections which, in use, will enable a head of a male tag to pass therethrough but to be subsequently retained by the projections, said base section being provided with an upwardly directed boss of an at least partially flexible material, said boss having an upper opening adapted to receive therein an insert of a substantially hard material in order to facilitate the tamper proofing of the female tag after its engagement with the male tag.

Optionally the female base section and an RFID component in the above tag are provided as a single unit.

According to a further aspect of the present invention a method of manufacture of a female identification tag or a female identification tag, is substantially as herein described with reference to any one or more of the embodiments of the invention and/or as described with reference to the accompanying drawings.

Further aspects of this invention, which should be considered in all its novel aspects, will become apparent from the following description, given by way of example, and with reference to the accompanying drawings.

BRIEF DESCRIPTION OF THE DRAWINGS

FIGS. 1a & 1b: show plan and cross sectional views of a female base section according to one possible embodiment of the invention and including an RFID coil;

FIGS. 22a & 22b: show another possible embodiment of the invention, being a modified design of that of FIGS. 20 and 21;

FIGS. 28a, b & c: shows an exploded view of the female tag of FIG. 27;

FIG. 30: shows an RFID coil being wound on the base section of the female tag of FIG. 1;

BRIEF DESCRIPTION OF POSSIBLE EMBODIMENTS

As mentioned above, the present invention is directed towards female identification tags especially for animals, which include a base section provided, or providable, with a plurality of projections around the female opening which can flex to enable the entry of the head of the male tag but can then resist the male tag head being pulled out. This provides a level of tamper proofing which is then, in preferred embodiments of the invention, supplemented by the provision of a hard insert positioned within a relatively soft boss formed above the base section of the female tag. By the use of such flexible projections at the female opening, the tags of the present invention are able to be used in very cold environments. This is not possible with female tags having a continuous opening. The tamper proofing may, if required, be further improved by the stem of the male tag being weakened so that it will fracture if undue force attempts to separate the male and female tags. The method of manufacture of the tags provided by the present invention also enables a multitude of various designs of female tags to be used, all of them using an essentially similar female base section, although this may or may not be provided with an RFID coil or the like.

Figure 2:
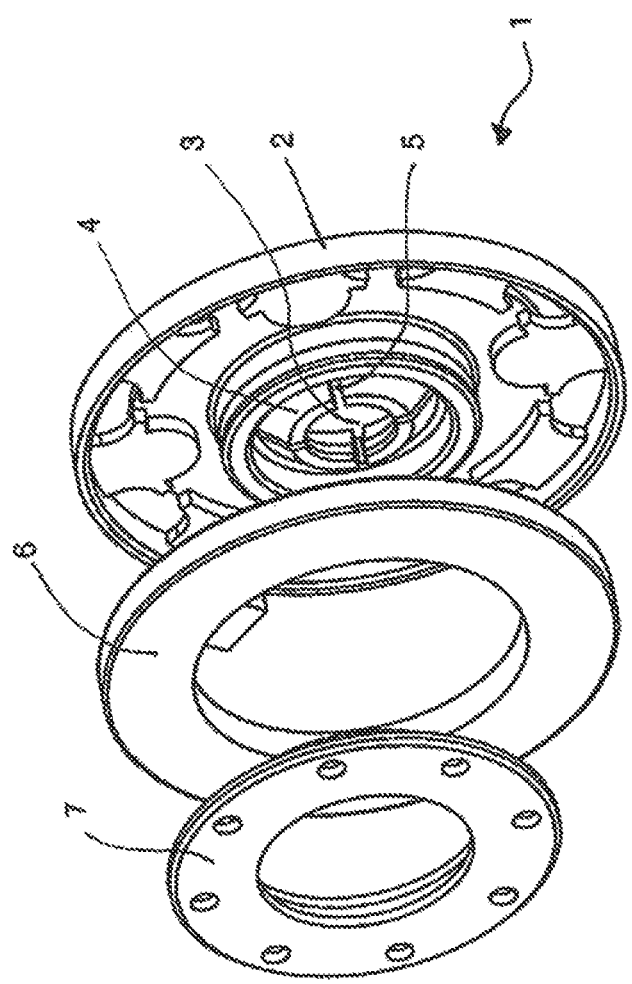
FIG. 2: shows an exploded view of the base section of FIG. 1.
Figure 3:
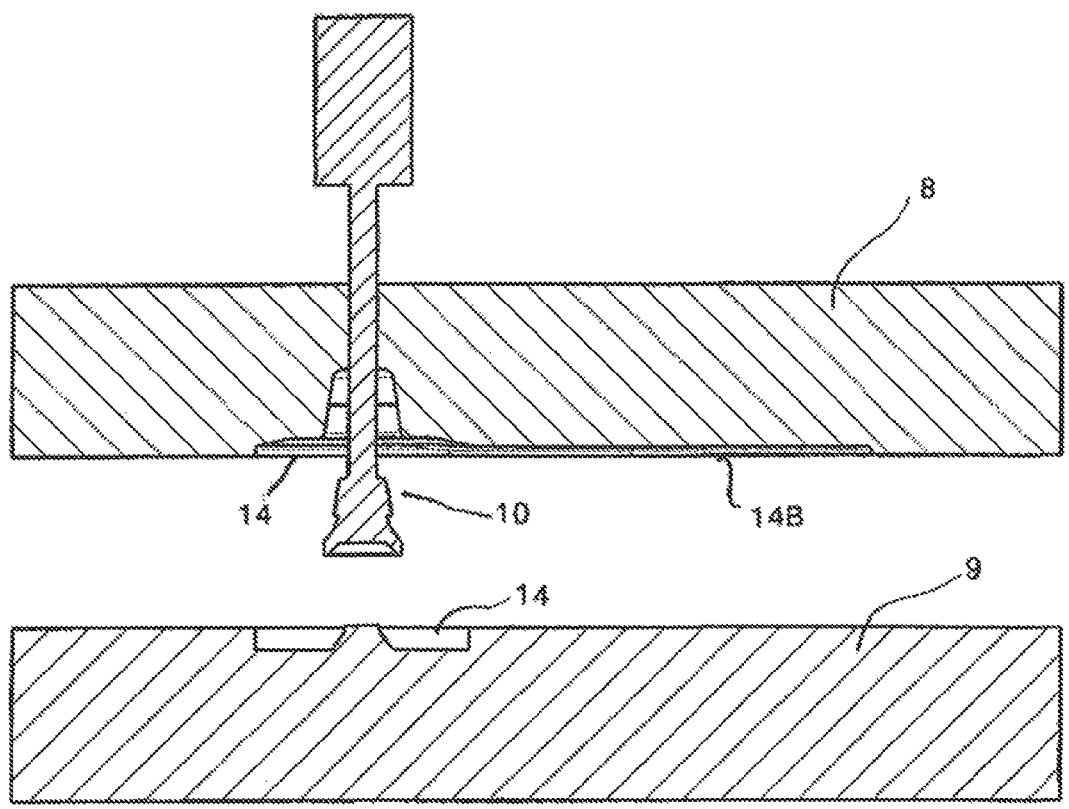
FIG. 3: shows very diagrammatically an open moulding tool with a core, for use in the manufacture of a female tag and according to one possible embodiment of the invention.

Turning therefore to FIGS. 1 and 2 of the accompanying drawings, a female tag base section is referenced generally by arrow 1. In this embodiment the base section 1 includes a base 2 with a substantially central opening 3 around which are positioned a plurality of inwardly directed inclined projections or fingers 4. These fingers 4 may be spaced apart from one another by actual slots 5 or, it is envisaged, they may be separated by lines of weakness or perforations so that the fingers 5 are formed as the male head enters the female opening 3. The base 2 has a peripheral chamber adapted to accommodate an RFID coil 6. An upper cover plate 7 completes the assembly. As will become clear later, this particular design of base section 1 is given only by way of example. In alternative embodiments the RFID coil could be omitted. The only essential feature of the base section 1 is that it includes a plurality of projections or fingers 4.

Turning then to FIGS. 3 to 11, a moulding tool includes upper and lower tool member parts 8 and 9, movable relative to one another, and a core 10 movable relative to both the mould parts 8 and 9. The mould parts 8 and 9 are each shown with appropriate recesses or cavities 14 which together with the core 10 will define the shape of the moulded tag, once the flowable plastics material has flowed into the recesses 14, 14B.

Figure 4:
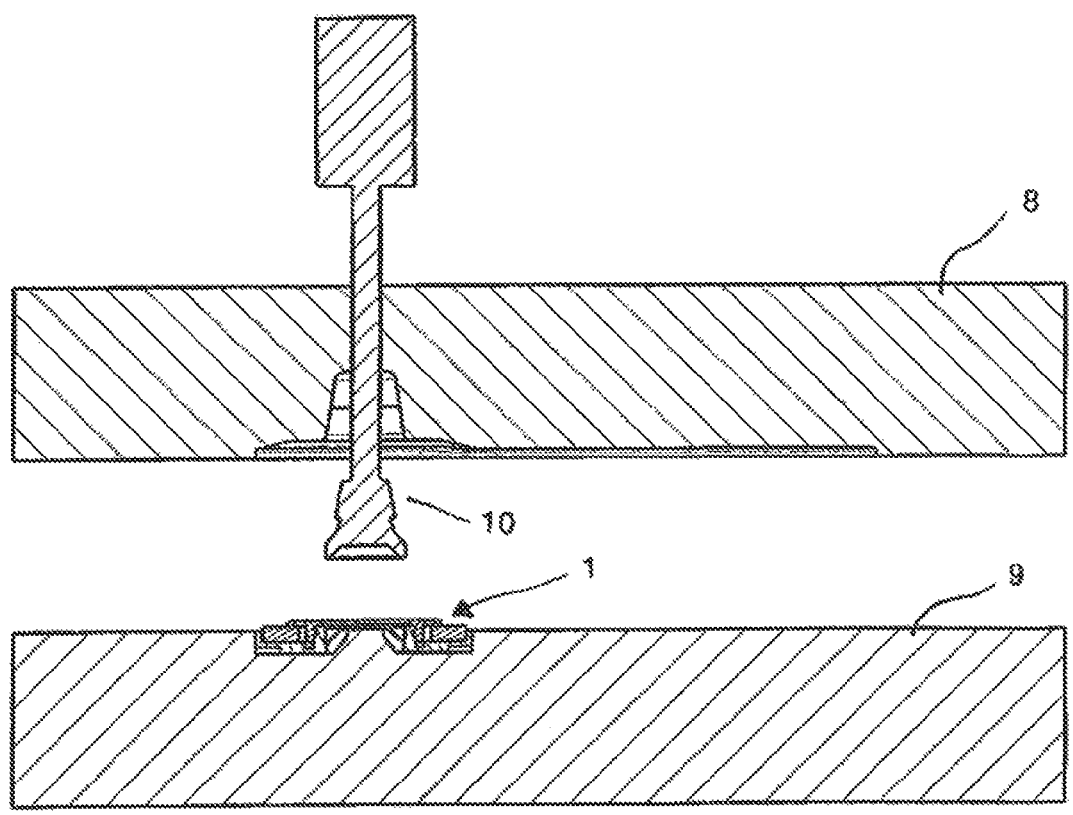
FIG. 4: shows the moulding tool of FIG. 3 but with the female base section loaded.
Figure 5:
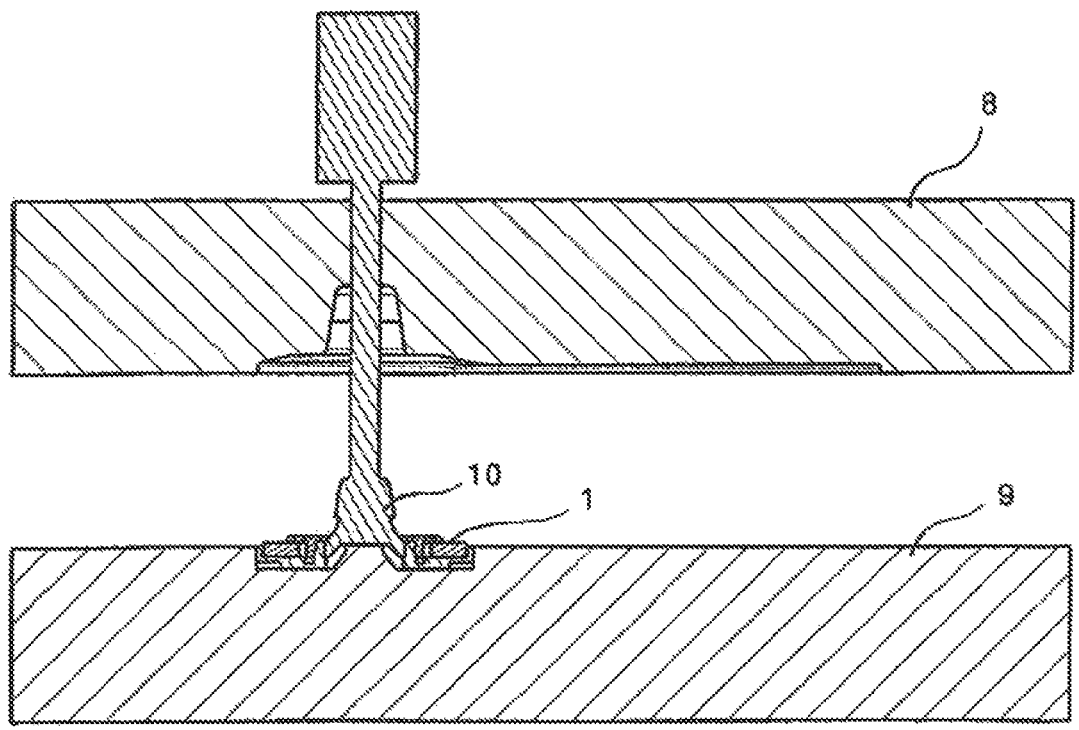
FIG. 5: shows the moulding tool loaded and about to close.
Figure 6:
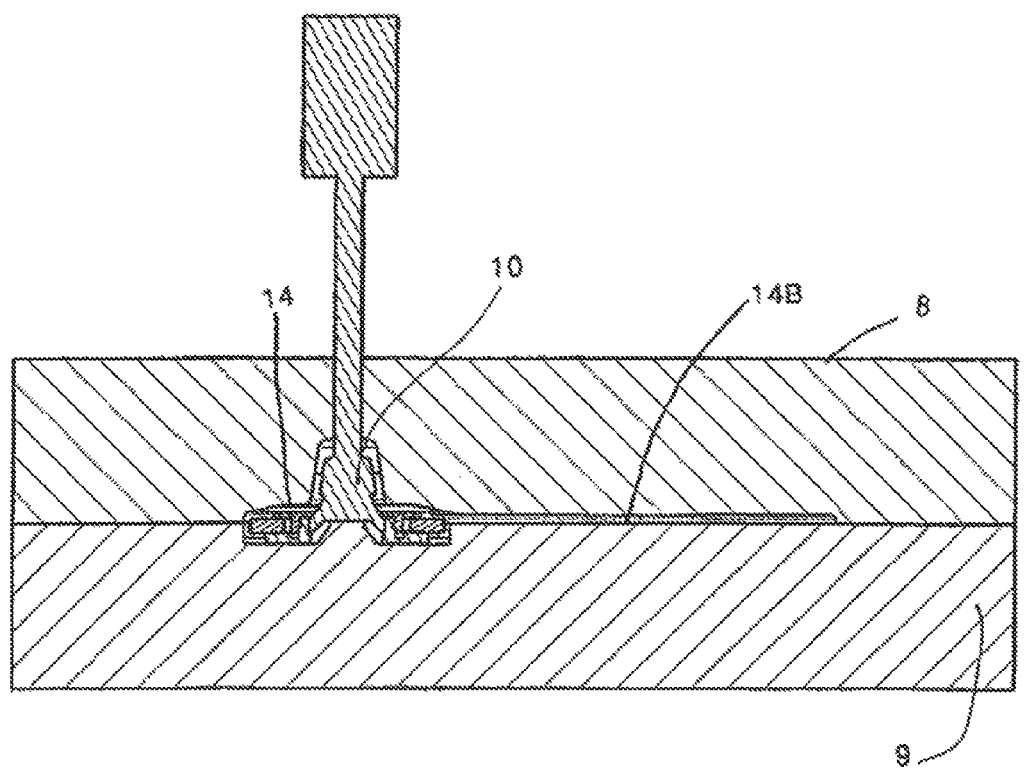
FIG. 6: shows the moulding tool closed prior to overmoulding.

In FIG. 4, a base section 1, such as that described in respect of FIGS. 1 and 2, has been positioned in the lower mould part 9 before, as is shown in FIG. 5, the core 10 has moved into position over the base section 1. Then, as shown in FIG. 6, the tool is closed prior to overmoulding commencing.

Figure 7:
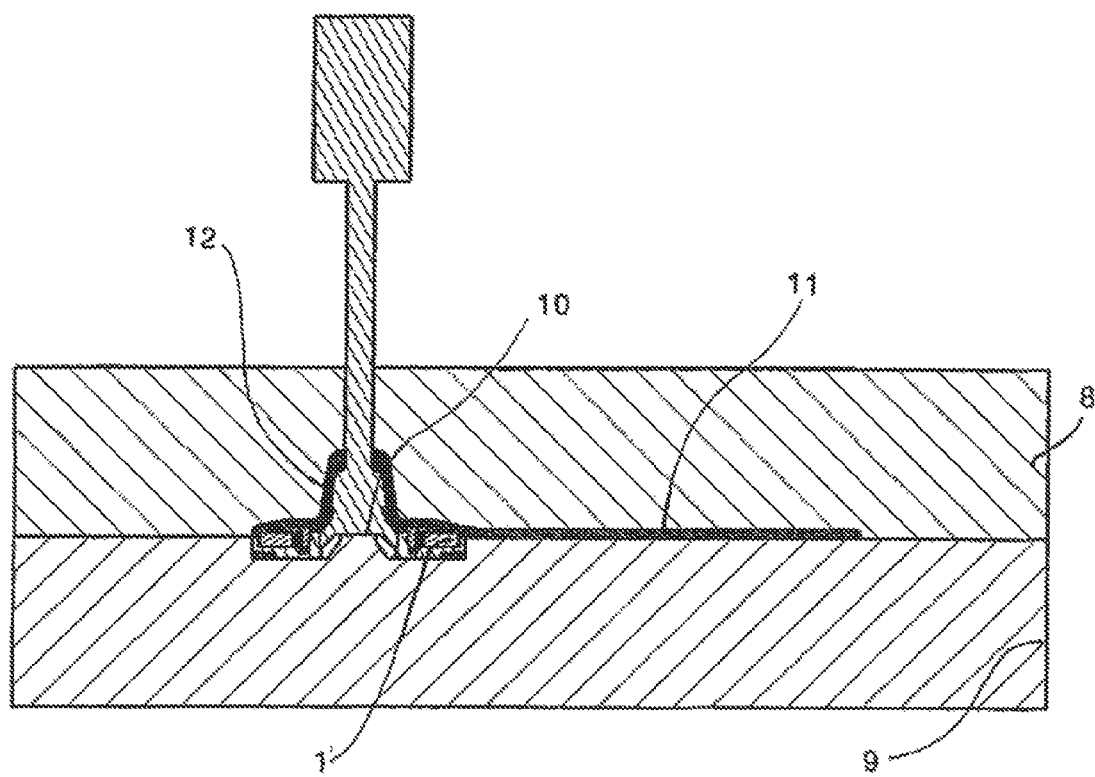
FIG. 7: shows the moulding tool with the overmoulding filling the cavities defined by the moulding tool.
Figure 8:
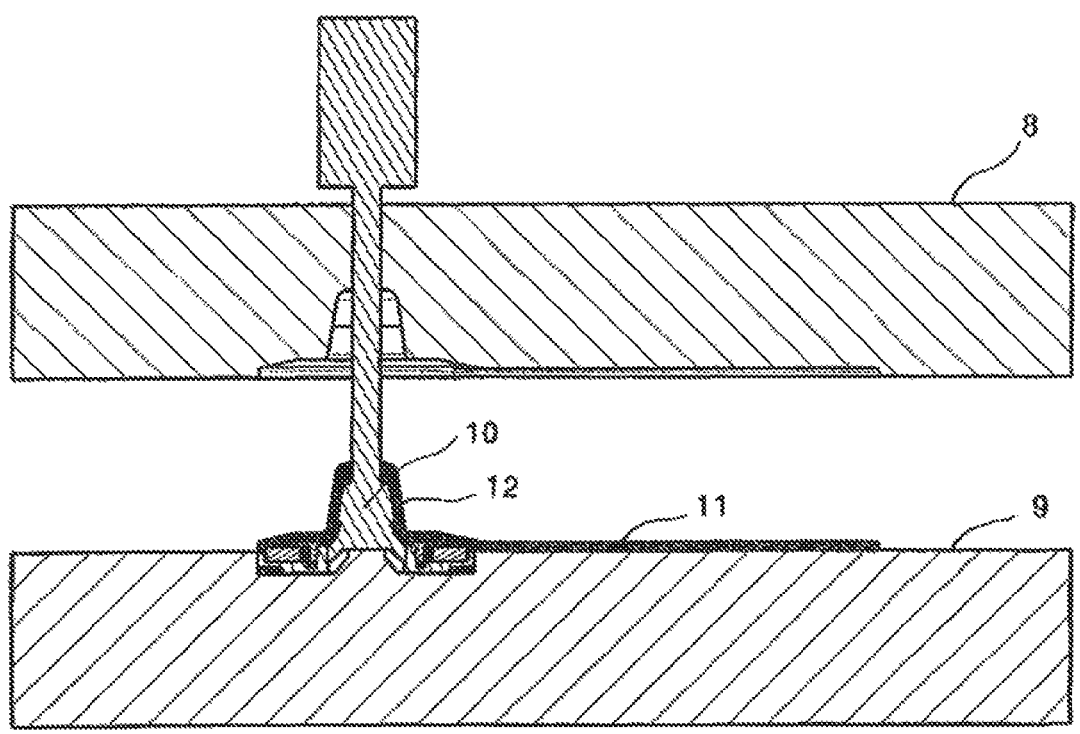
FIG. 8: shows the moulding tool opening but with no movement of the core.
Figure 9:
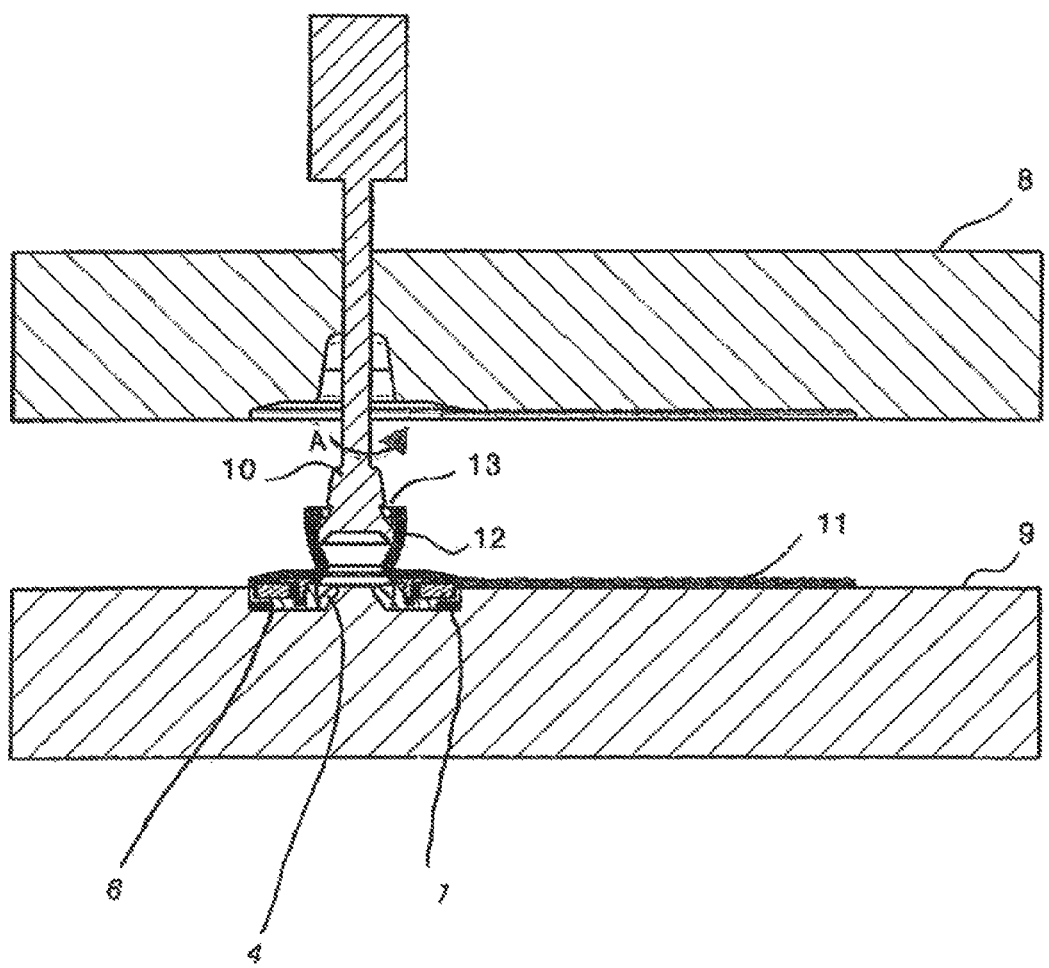
FIG. 9: shows the moulding tool opening and with the core rotating as it ejects through the opening at the top of the boss which has been formed.
Figure 10:
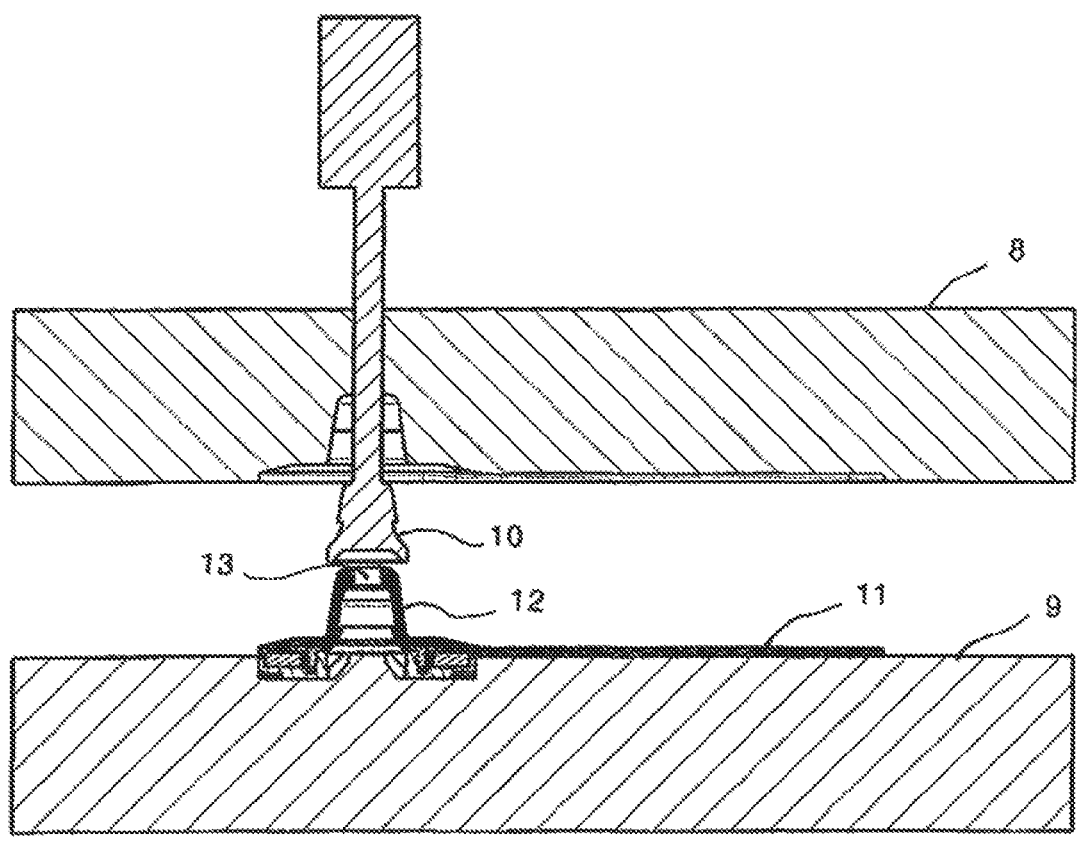
FIG. 10: shows the moulding tool open and with the core fully ejected.

Referring then to FIG. 7, the flowable plastic material is shown having filled the recesses provided by the mould parts 8 and 9 and the cavity defined around the core 10, so as to form a flag 11, a boss 12 and with overmoulded material around and within the base section 1. In forming the flag 11, the overmoulded material has flowed into recess 14B (see FIG. 6). If a "button" tag were required. i.e. one with no flag, then the recess 14B would be omitted. Then, in FIG. 8, the tool members 8 and 9 are shown opening, although the core 10 remains stationary. Then, in FIG. 9, the core 10 starts to eject, moving through the flexible opening 13 formed at the top of the soft boss 12. Preferably, as shown by arrow 'A' in FIG. 9, the core 10 is caused to rotate as it moves through the flexible opening 13 in order to break the bond between the plastics material and the core 10. Turning then to FIG. 10, the core 10 has fully ejected and the soft boss opening 13 has returned to its original size.

Figure 11:
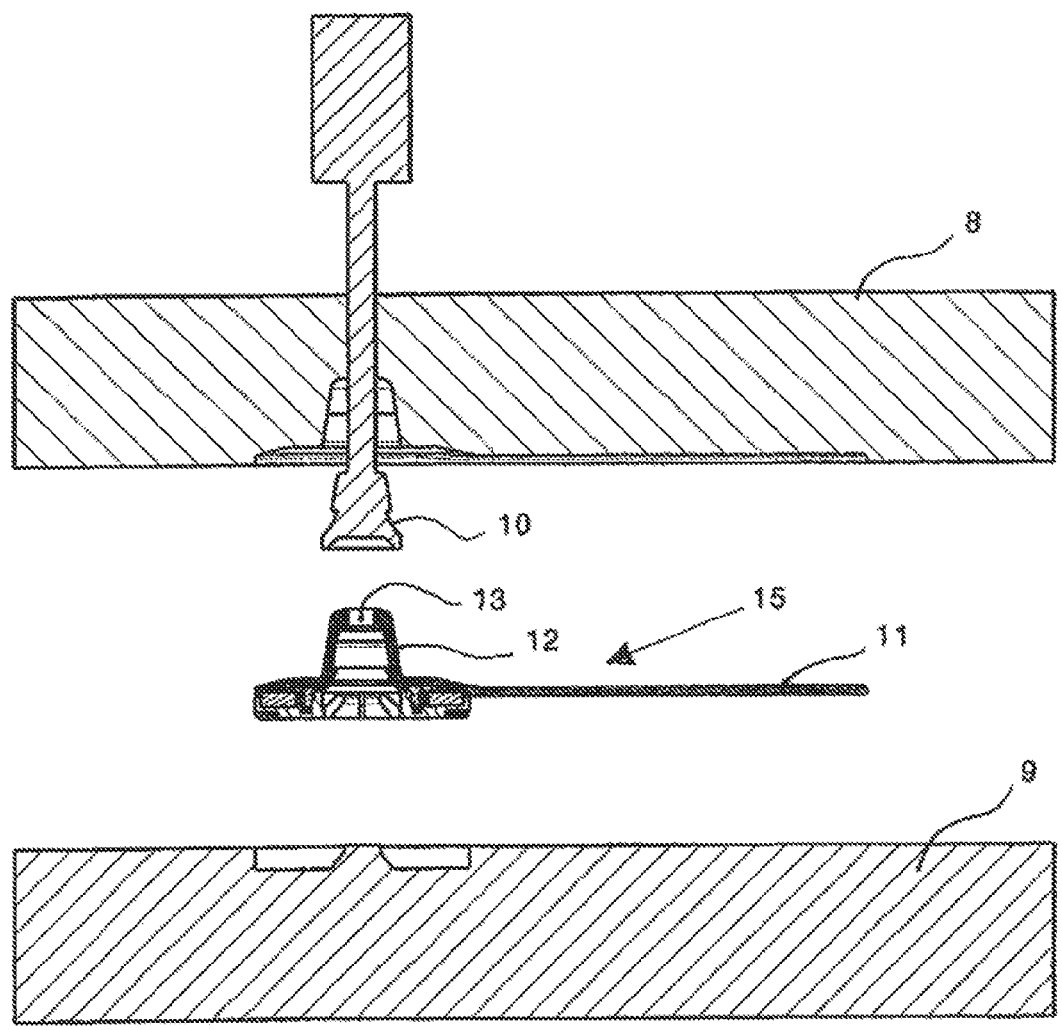
FIG. 11: shows the moulding tool fully open and with the female tag ejected.

Referring then to FIG. 11, a fully formed female tag 15, with its large flag 11 and soft boss 12, is shown being ejected from the fully open moulding tool.

In accordance with the normal moulding practice, additional ejector pins and ejector sleeves (not shown) would be included as part of the mould.

Figure 12:
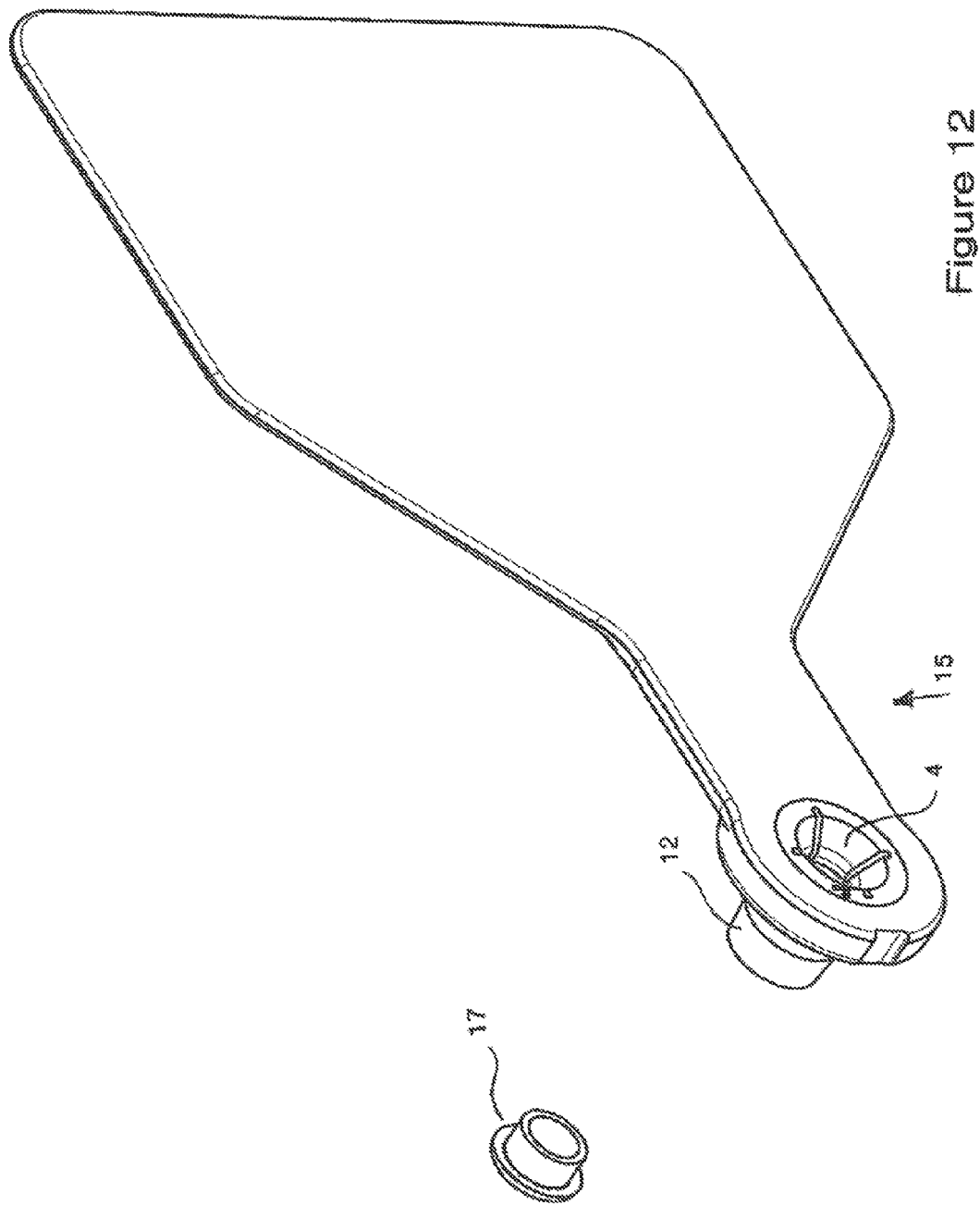
FIG. 12: shows a female tag according to one possible embodiment of the invention with a top cap about to be inserted and welded.
Figure 13:
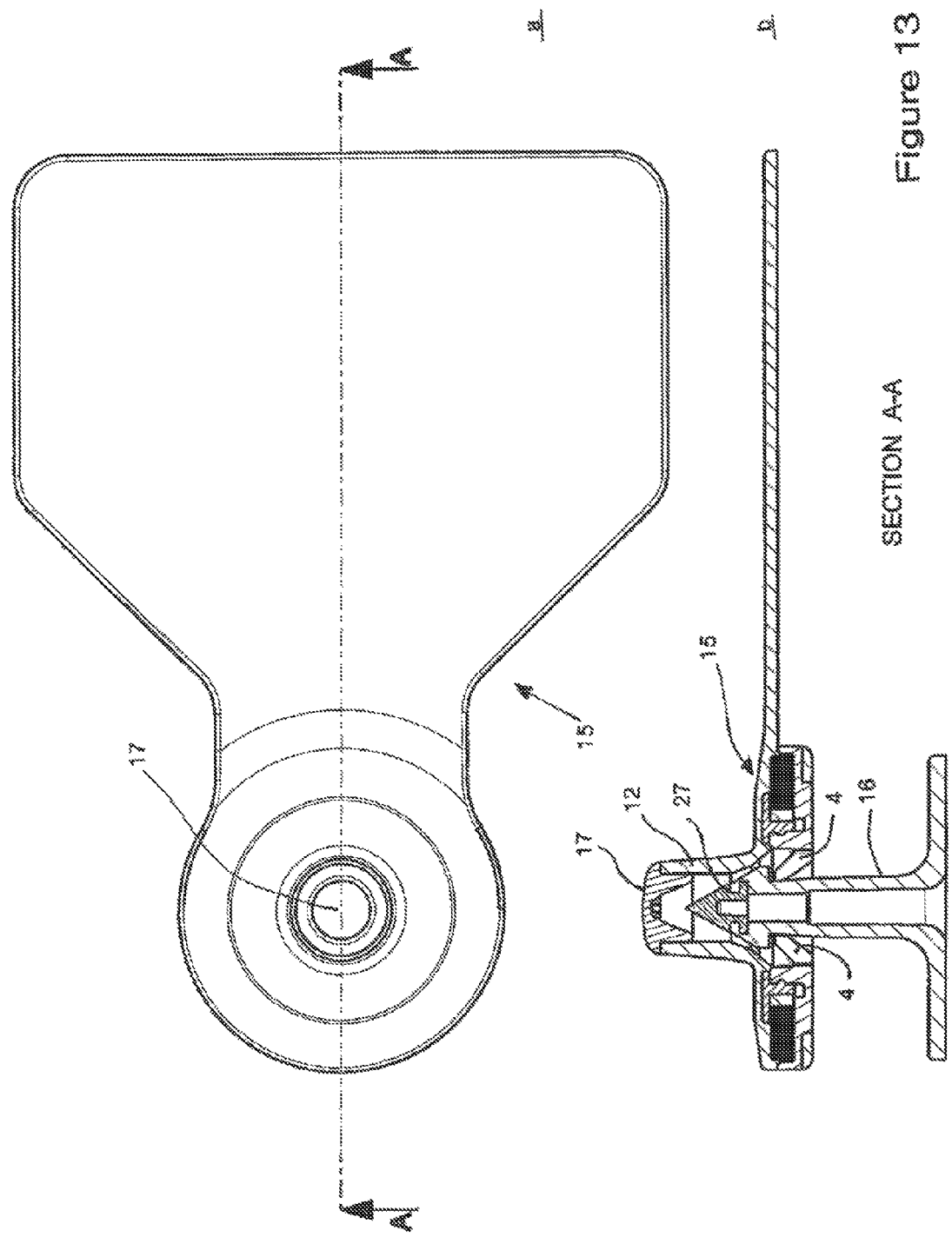
FIGS. 13a & 13b: show plan and cross-sectional views of the tag of FIG. 12 with the top cap welded in position.

Turning now to FIGS. 12 and 13, a female tag 15, manufactured as hereinbefore described, may subsequently have a hard cap 17 welded, suitably by ultrasonic or high frequency welding, to the top of the soft boss 12. The insert or cap 17 may be of a hard grade polyurethane (TPU), while the softer material of the overmoulding may be, for example, a softer grade of TPU. As will be seen, particularly in FIG. 13b, a male tag 16 has its head 27 retained by the fingers 4 within the chamber defined by the soft boss 12, following the entry of the head 17 into the female tag 15.

Figure 14:
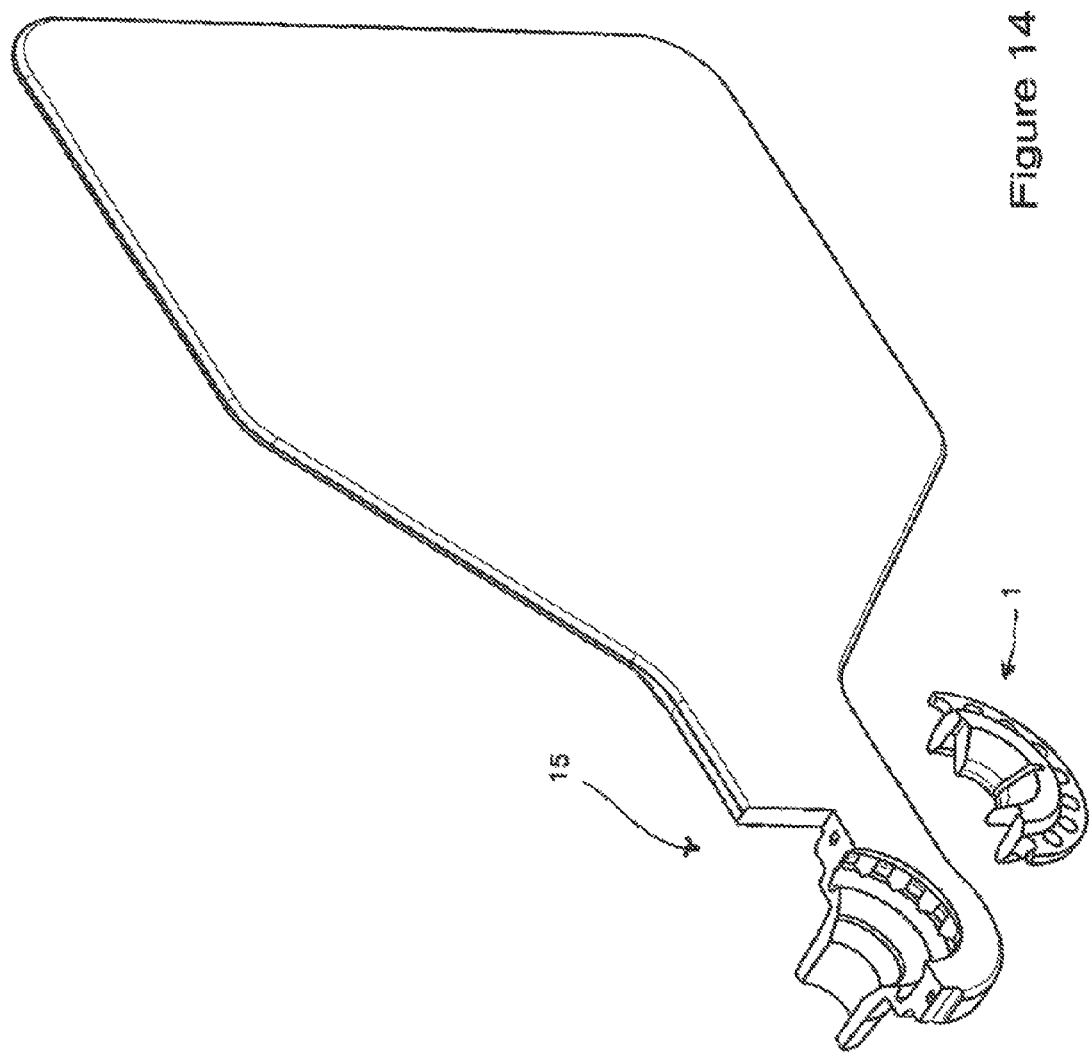
FIG. 14: shows a female tag according to another possible embodiment of the invention but utilising a base section without an RFID coil.
Figure 15:
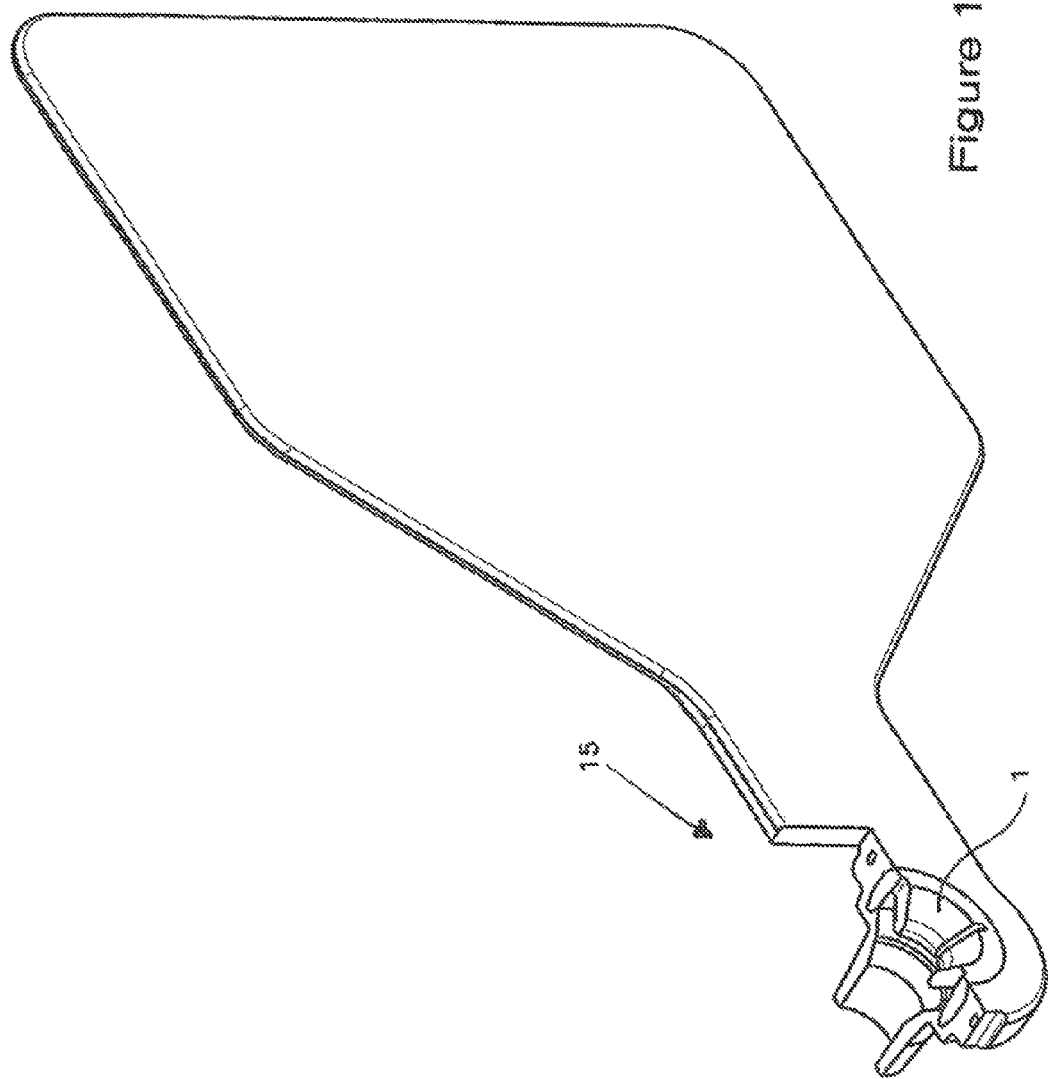
FIG. 15: shows the tag of FIG. 14 with its base section as formed by overmoulding.
Figure 16:
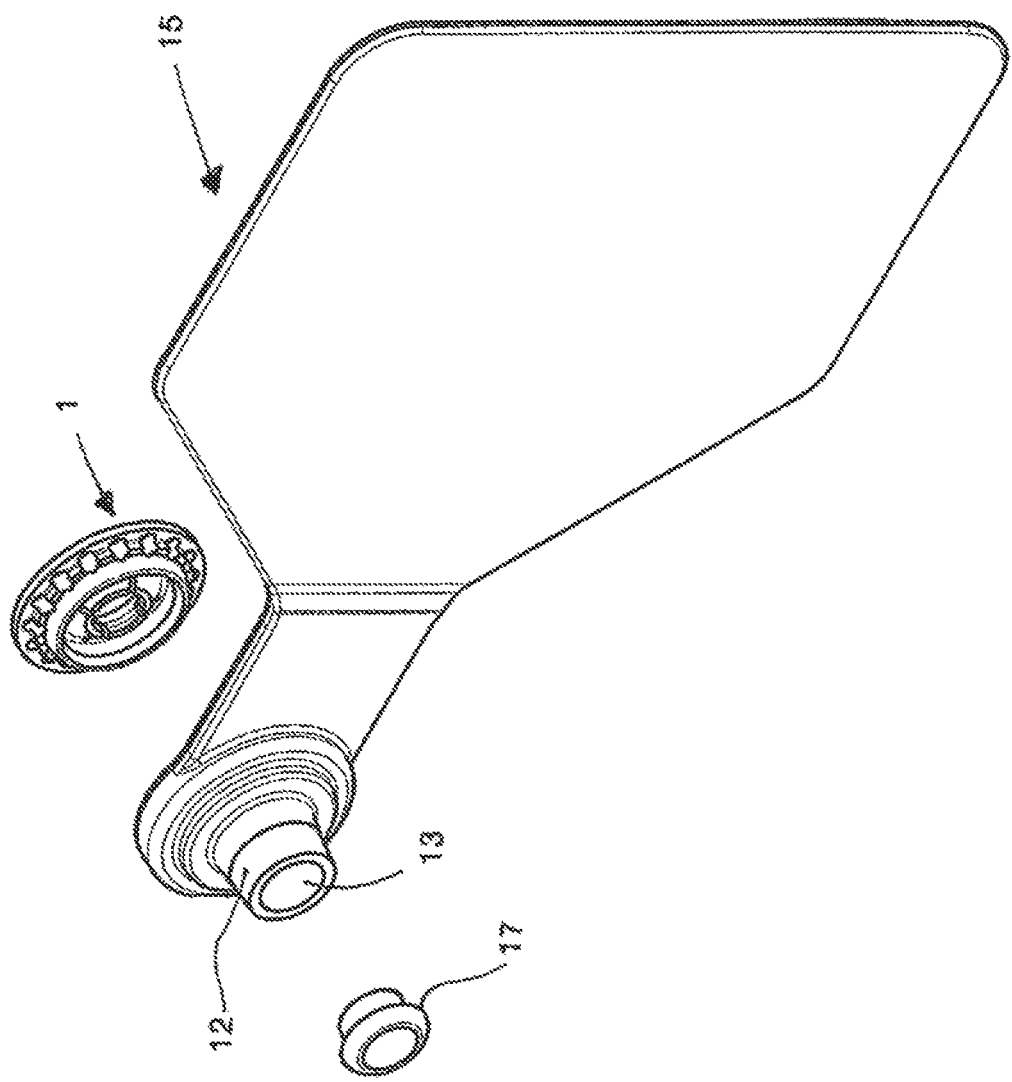
FIG. 16: shows a female tag of the type shown in FIGS. 14 and 15 but with a top cap about to be inserted.
Figure 17:
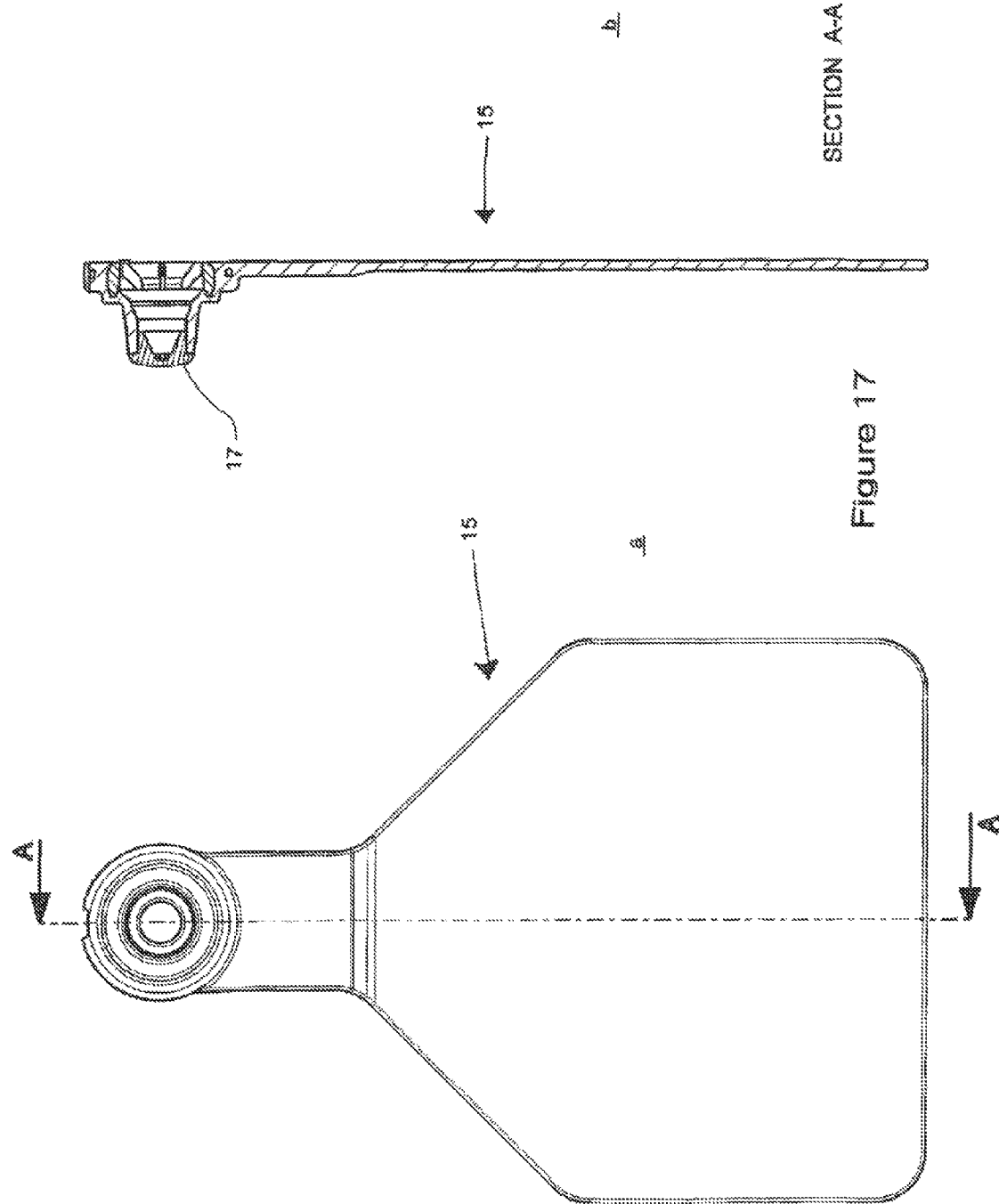
FIGS. 17a & 17b: show plan and cross-sectional views of the tag of FIG. 16 with the top cap inserted and welded.

As mentioned previously, the female tag 15 may, in alternative embodiments, not have an RFID capability so that, as shown in FIGS. 14 and 15, the base section 1 used in the manufacture of the tag 15 may be absent any RFID coil. Such a tag, also shown in FIGS. 16 and 17, may also have a hard top cap or insert 17 welded over the opening 13 of the soft boss 12.

Figure 18:
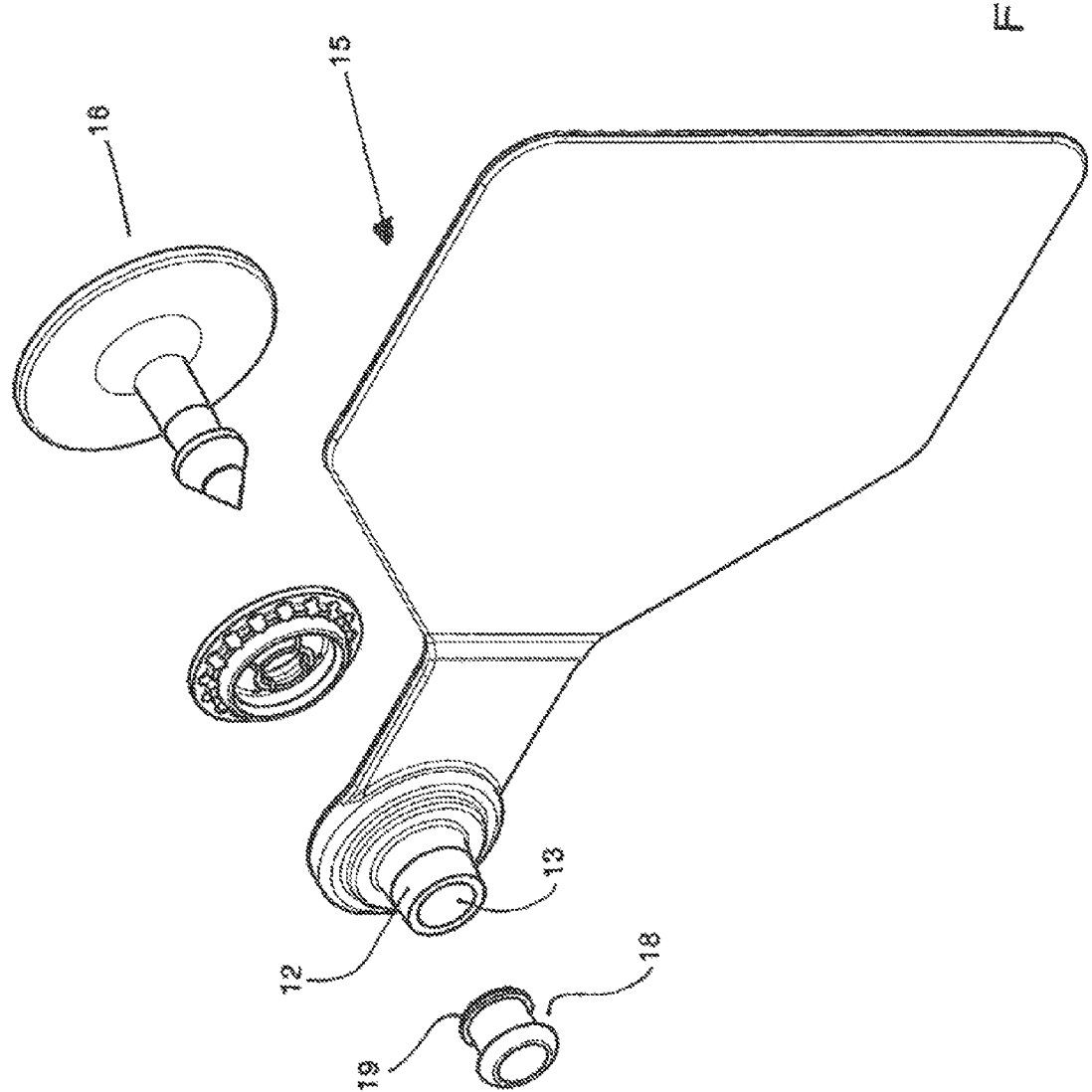
FIG. 18: shows a further possible embodiment of the invention but with a top cap which is a snap fit in the boss of the female tag and further shows diagrammatically a male tag.
Figure 19:
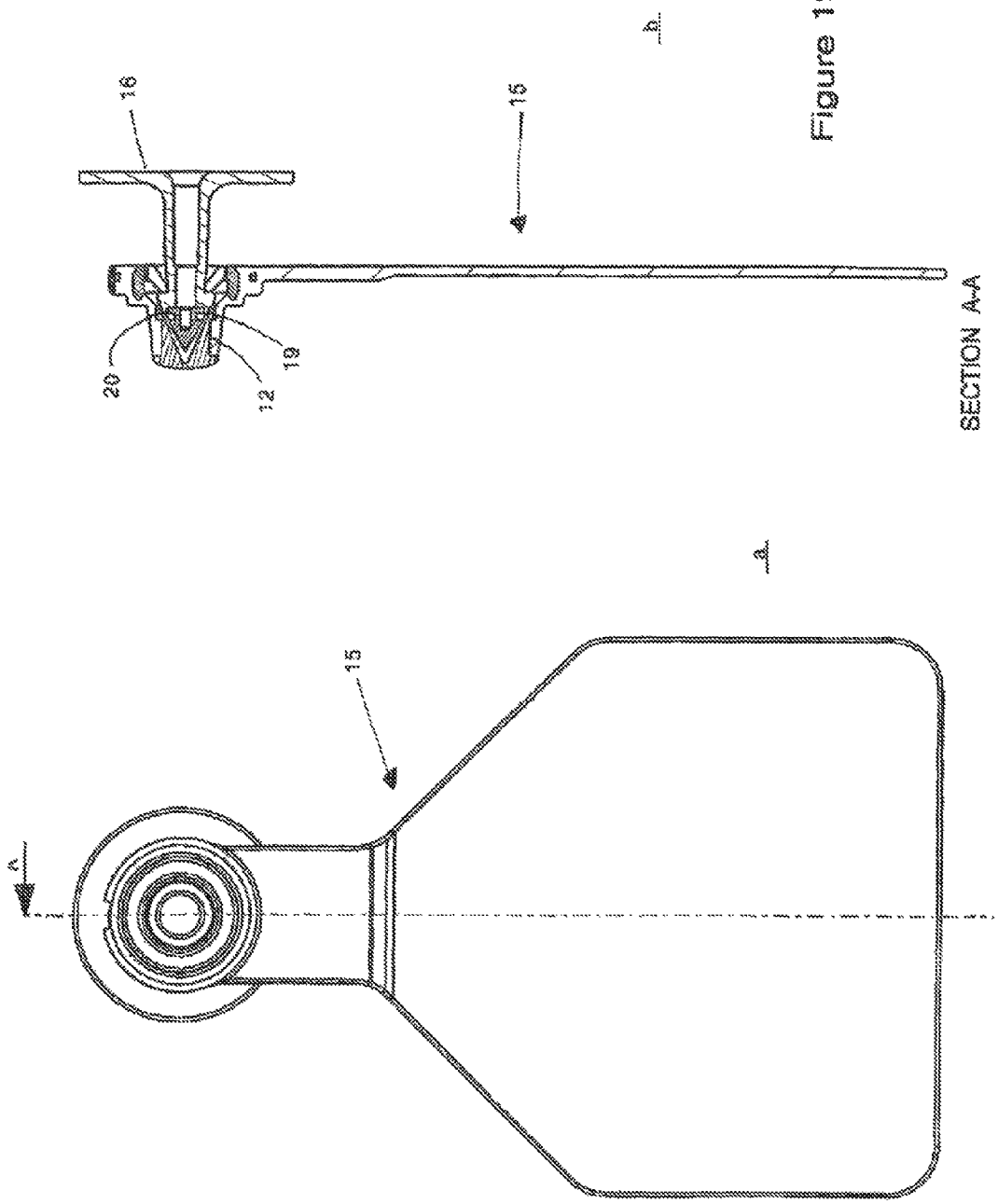
FIGS. 19a & 19b: show plan and cross-sectional views of the tag of FIG. 18 with the top cap snap fitted into position.
Figure 20:
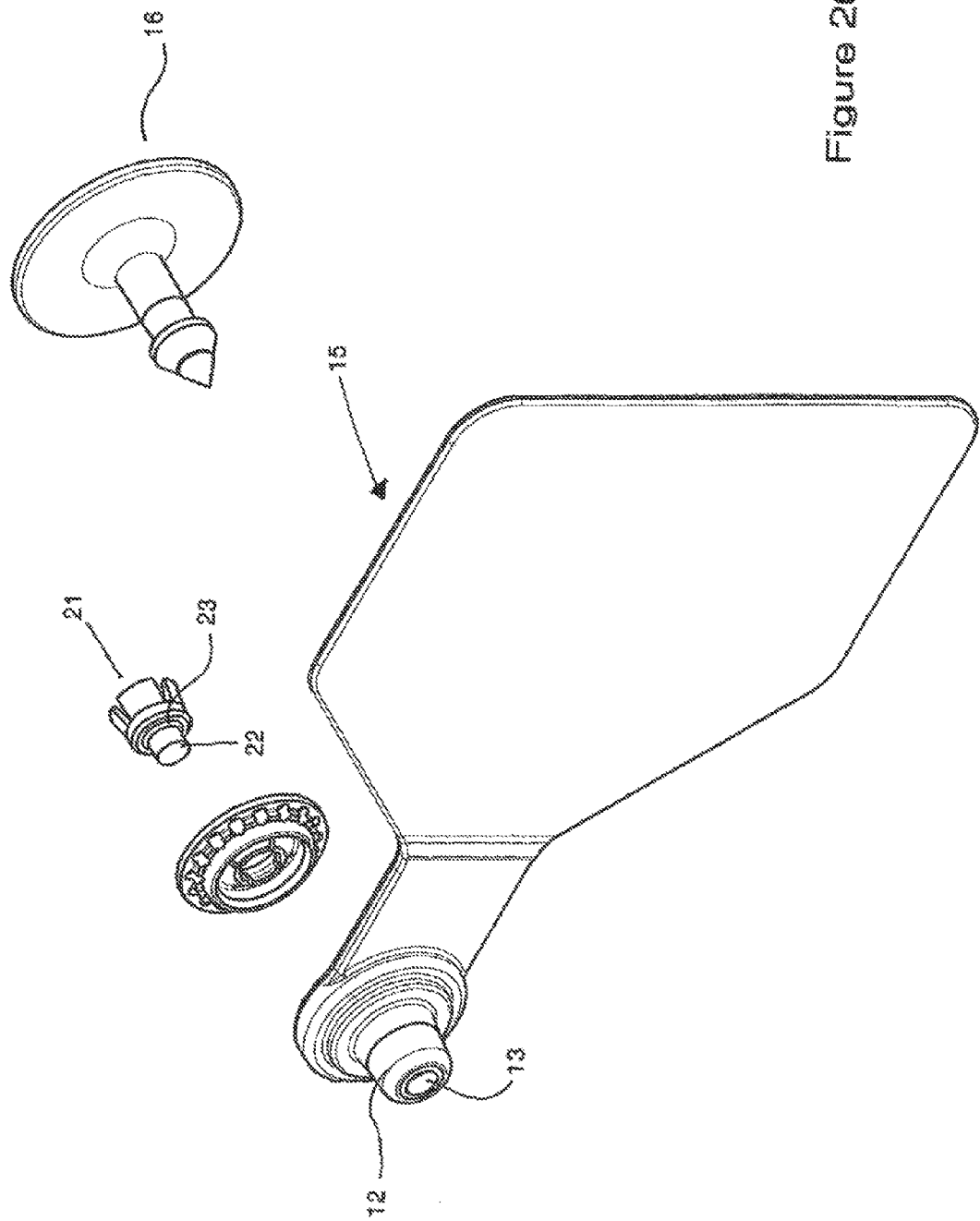
FIG. 20: shows a female tag according to a further embodiment of the invention in which the top cap is inserted through the base section of the female tag.
Figure 21:
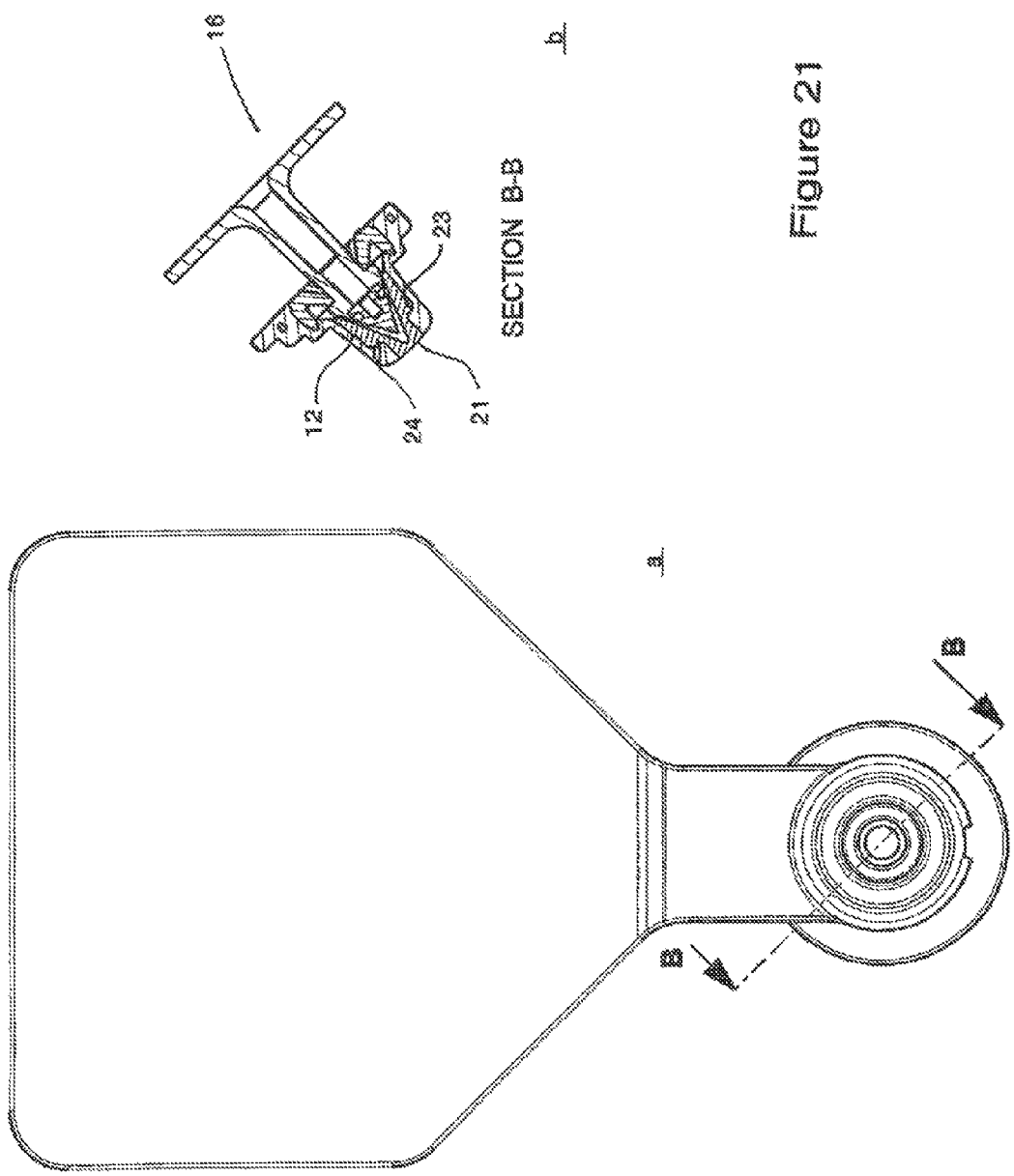
FIGS. 21a & 21b: show the tag of FIG. 20 following the insertion of the insert through the base section of the female tag.

In an alternative embodiment as shown in FIGS. 18 and 19, another design of hard top cap or insert 18 may be used to close the opening 13 at the top of the soft boss 12. As seen, the top cap 18 may include a bottom flange 19 which can engage in a snap-fit within a recess 20 provided on an inner wall of the soft boss 12, as shown particularly in FIG. 19b. In a further alternative embodiment, as shown in FIGS. 20 and 21, another form of hard insert 21 is shown being positioned, so as to close the opening 13 of the soft boss 12, through the base of the female tag 15. The insert 21 has a projection 22 which fits within the aperture 13 of the boss 12 and a flange 23 which can abut against a shoulder 24 provided on an inner wall of the soft boss 12, see particularly FIG. 21b.

Figure 23:
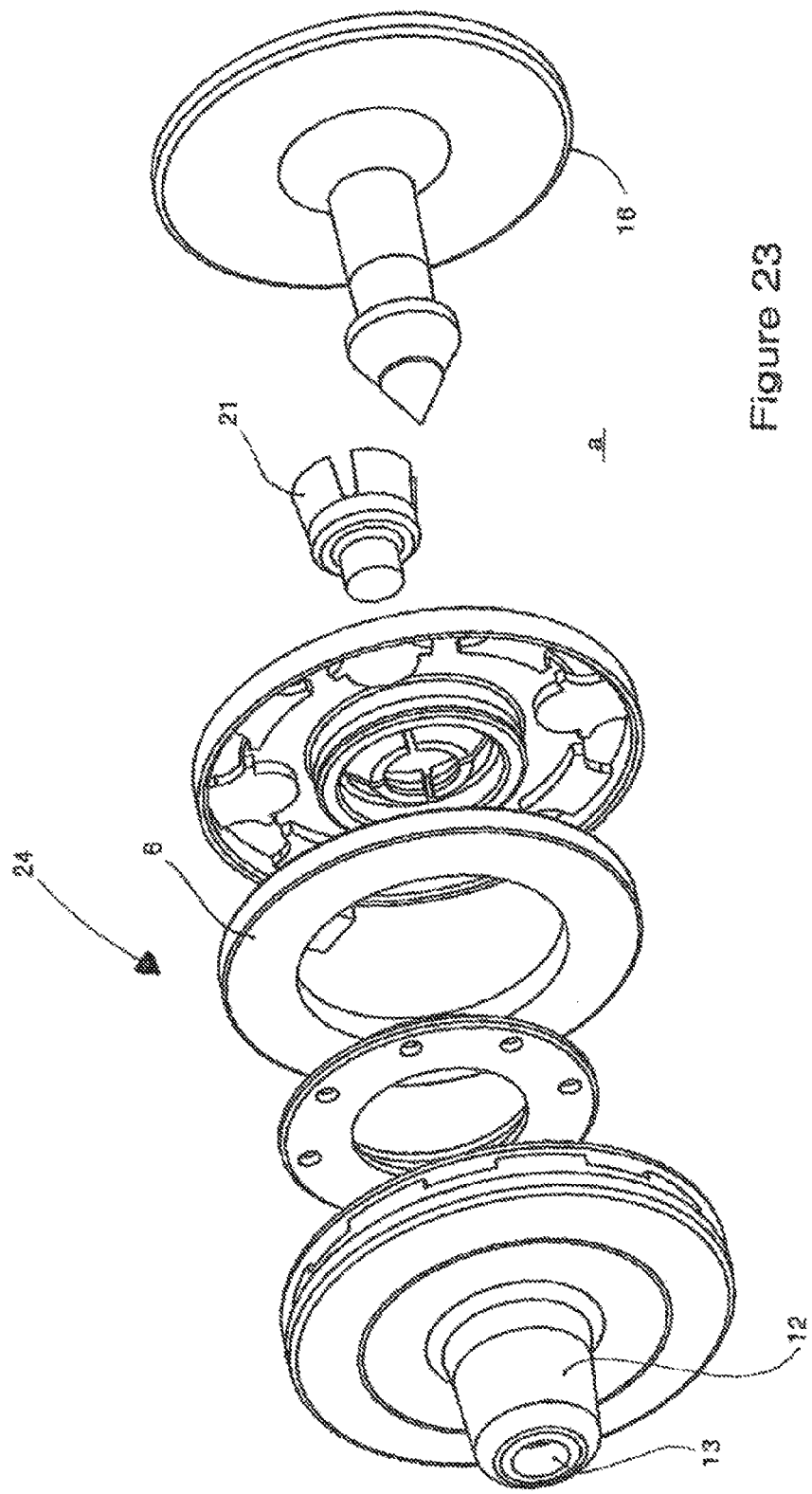
FIGS. 23a-e: show exploded side and cross-sectional views of a female tag according to a further possible embodiment of the invention with the female tag in the form of a button tag, and, in FIGS. 23b-e, with the insert progressively being inserted through the base section of the female tag.

As mentioned previously, the female tag 15 may in alternative embodiments not have a flag 11 but instead be in the form of a button tag, such as referenced generally by 24 in FIGS. 22 and 23, otherwise the same reference numerals being used where appropriate. This button tag 24, as seen particularly in FIG. 23a, includes an RFID coil 6 and an insert 21 insertable through the base of the female tag 24 in order to close off the opening 13 of the soft boss 12. In FIGS. 23b, c, d and e, the insert 21 is shown progressively moving into position within the soft boss 12, through the base section 1 of the female tag 24, the fingers on the insert 21 able to compress to facilitate its progress. An undercut or ledge 28, see FIG. 23e, assists in holding the insert 21 in position.

Figure 24:
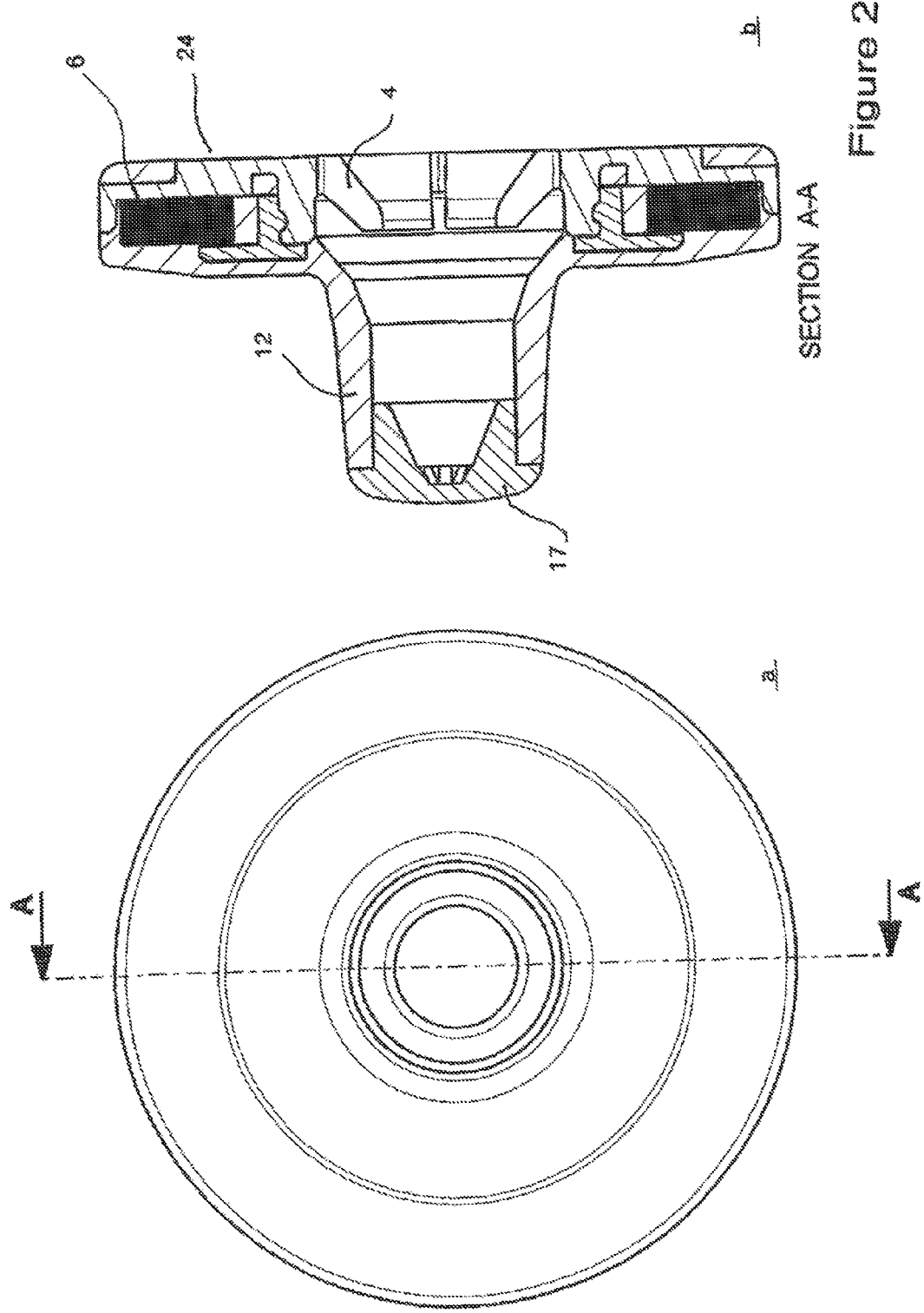
FIGS. 24a & 24b: show plan and cross-sectional views of a female tag according to a further possible embodiment of the invention with the female tag in the form of a button tag.
Figure 25:
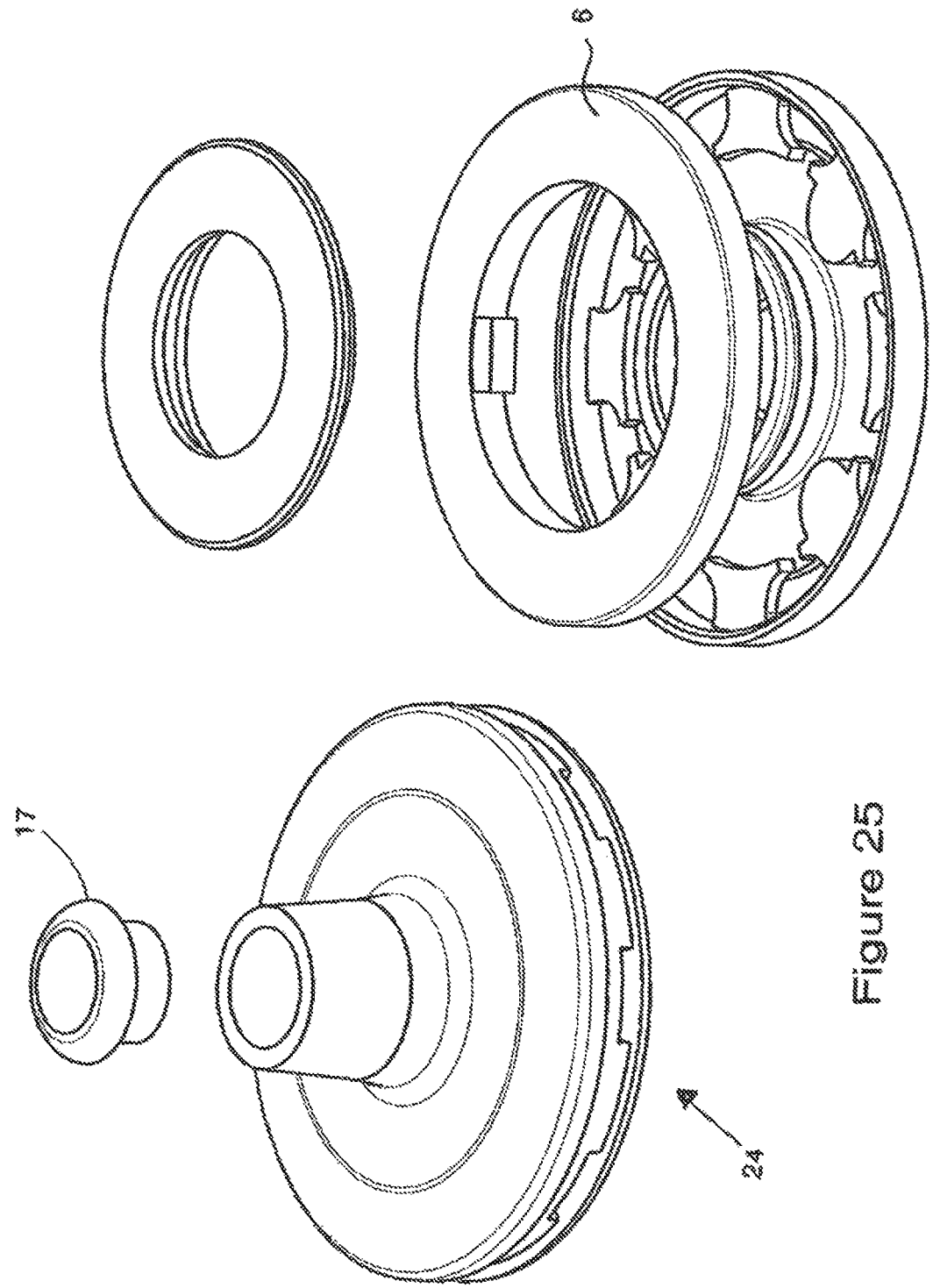
FIG. 25: shows an exploded view of the tag of FIG. 24.

Then in FIGS. 24 and 25, the button tag 24 is shown, in an alternative embodiment, with a top cap or insert 17 which is welded to the top of the soft boss 12.

Figure 26:
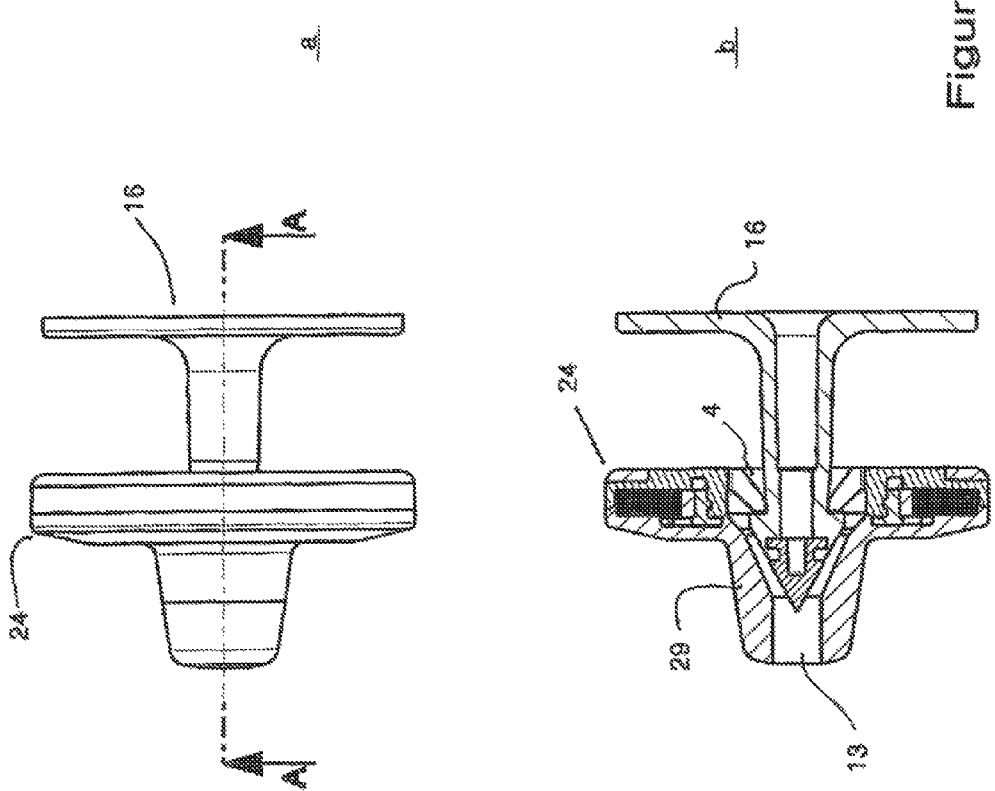
FIGS. 26a & 26b: show side and cross-sectional views of a female tag according to a further possible embodiment of the invention in which the boss has thick walls.

Turning then to FIGS. 26a and 26b, in an alternative embodiment, instead of utilising a hard insert or cap 17 or 21, the aperture 13 at the top of the boss 25 may be left open but the tamper proofing of the female tag 24 can be improved by including a thick wall 29 to resist attempts to access the head of the male tag 16 and intentionally push out the head past the fingers or projections 4.

Figure 27:
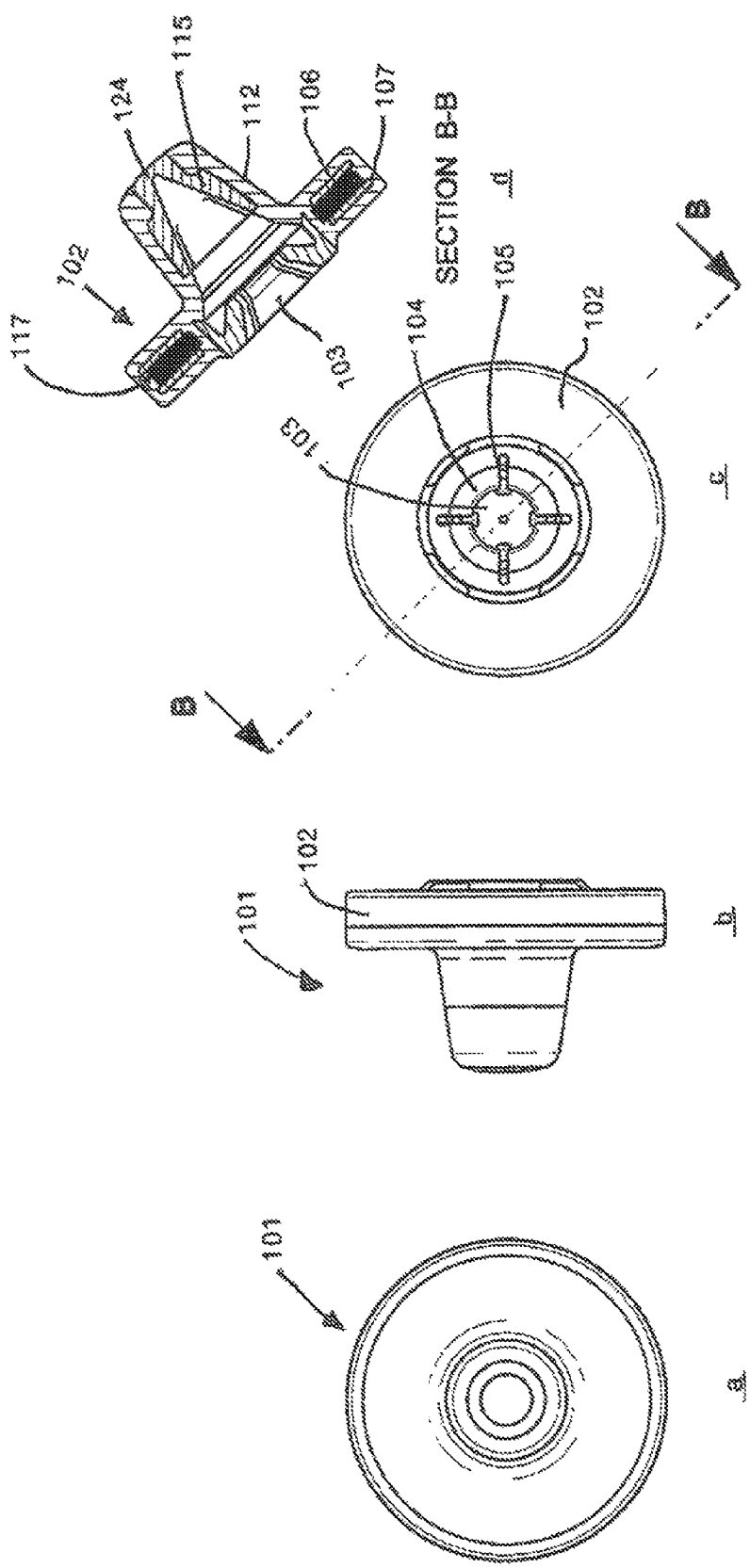
FIGS. 27a, b, c & d: show respectively, plan, side, underneath and cross sectional views of a female tag according to another possible embodiment of the invention and including an RFID coil.

Turning now to FIGS. 27 and 28 of the accompanying drawings, a female tag is referenced generally by arrow 101. In this embodiment the tag 101 includes a base 102 with a substantially central opening 103 around which are positioned a plurality of inwardly directed inclined projections or fingers 104. These fingers 104 may be spaced apart from one another by actual slots 105 or, it is envisaged, they may be separated by lines of weakness or perforations so that the fingers 105 are formed as the male head enters the female opening 103. The base 102 has been formed by overmoulding through and about a base section 117 which can accommodate an RFID component such as coil 106. As shown, the base section 117 is fully enclosed by the overmoulding to form the base 102.

The overmoulding has also provided a boss 112 which may, as shown, accommodate a hard insert 115, a projection 124 of the insert 115 being located in the top aperture 113 of the boss 112.

Figure 29:
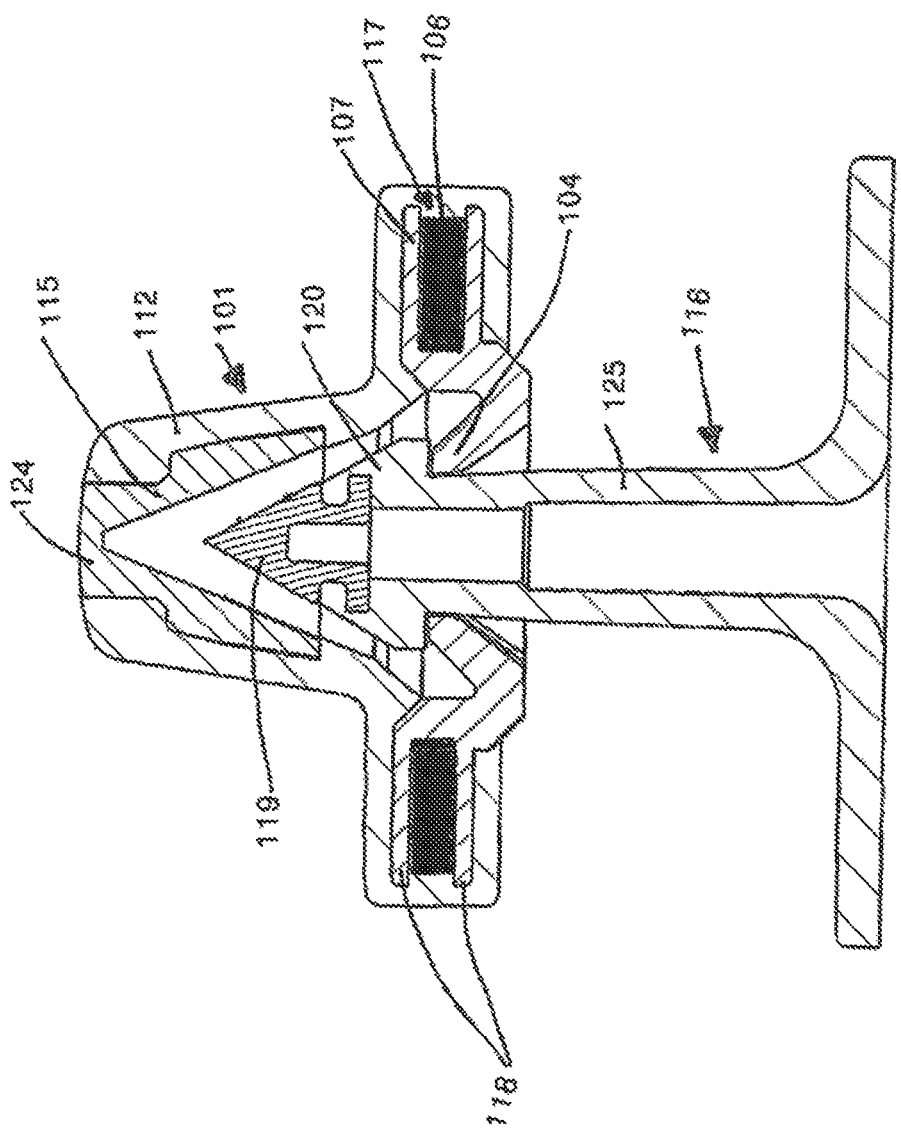
FIG. 29: shows a cross sectional view of the female tag of FIG. 1, engaged with a male tag.

In FIG. 29, a male tag 116 with a stem 125 is shown with its head 120 and hard insert 119, located within the female tag 101 and held by the fingers 104.

The insert 115 may include, see FIG. 28 especially, a skirt 123 with slots 122, to facilitate its insertion into the boss 112 through the aperture 103 in the base 102.

In manufacturing the tag of FIGS. 27 and 28, and referring again to FIG. 3, the base section 117, will be positioned in the lower mould part 109 before the core 110 is moved into position over the base section 117. The tool is then closed prior to overmoulding commencing as described above until finally, when the core 110 starts to eject, it moves through the flexible opening 113 formed at the top of the soft boss 112.

Referring now to FIG. 30, in one possible embodiment, the RFID component 106 of the female tag 102, is provided as an RFID coil 106 which has been wound on a base former or bobbin 107 to form the base section 117. The base former 107 is shown positioned on a spindle 111 which may be rotated as the copper wire or the like 106A is wound onto the base former 107 between its spaced apart flanges 118.

In providing the base section 117 as a single part with the fingers 104, consisting of the former or bobbin 107 and the coil 106, instead of a multiple part assembly, such as in FIG. 1 for example, a less costly manufacture can result. It is envisaged that this embodiment of the present invention may be particularly suitable for tags intended for use with sheep where a boss insert 15 may not be required.

Although a "button" type design has been described above, it will be appreciated that the present invention has application for any design of tag, including of the alternative large "flag" type.

It will be appreciated from the above description that the present invention enables the use of fingers or projections in the female opening for a large variety of female tags, which can be suitable for use in all environments, even those with sub-zero temperatures. The invention includes a method of manufacture of those female tags.

Where in the foregoing description, reference has been made to specific components or integers of the invention having known equivalents then such equivalents are herein incorporated as if individually set forth.

Although this invention has been described by way of example and with reference to possible embodiments of the invention, it is to be understood that modifications or improvements may be made thereto without departing from the scope or spirit of the invention as defined in the appended claims.

The invention claimed is:

1. A method of manufacture of a female identification tag comprising:
   i. positioning within an open moulding tool a female base section including an opening with inwardly directed projections;
   ii. closing the moulding tool and its core over the female base section to define areas for overmoulding;
   iii. filling the defined areas with the overmoulding material so as to include the formation of a boss as part of a female tag;
   iv. opening the moulding tool and provide for its core to move through an upper opening formed in the boss; and
   v. ejecting the female tag from the open tool;
   wherein the boss is at least partially flexible,
   wherein the upper opening of the boss is narrower than a chamber defined by the moulding tool in the boss, the chamber delimiting a space wherein a head of a male tag may be retained by said inwardly directed projections, wherein the upper opening of the boss is widened by the core of the moulding tool, when the core is extracted from the chamber through the upper opening, and wherein the upper opening returns to its original size when the core is fully ejected from the chamber, and wherein the boss has a sidewall extending upwardly from the female base portion that defines the chamber, and wherein the upper opening of the boss is at the an end of the sidewall that is distanced from the female base portion.

2. A method of manufacture as claimed in claim 1 wherein the female base section and a radio frequency identification (RFID) component are provided as a single unit.

3. A method of manufacture as claimed in claim 2 wherein the RFID component is provided as an RFID coil which has been wound on a base former or bobbin to form the female base section.

4. A method of manufacture as claimed in claim 1 wherein the core is caused to rotate as it moves through the upper opening formed in the boss in order to break any bond between the core and the overmoulding material.

5. A method of manufacture as claimed in claim 1 in which a radio frequency identification (RFID) component is accommodated within the female base section.

6. A method of manufacture as claimed in claim 1 in which the defined areas include an area in which a flag portion is formed for the tag.

7. A method of manufacture as claimed in claim 1 in which a hard insert is secured within the upper opening formed in the boss.

8. A method of manufacture as claimed in claim 7 in which the hard insert is inserted through the base section.

9. A method of manufacture as claimed in claim 1 in which the boss is formed with a thickened wall.

10. A method of manufacture as claimed in claim 1 in which the overmoulding material fully encloses the base section.

11. A female identification tag when manufactured by the method of claim 1.

12. A female identification tag including a female base section comprising an opening with a plurality of inwardly directed projections which, in use, will enable a head of a male tag to pass therethrough but to be subsequently retained by the projections, said base section being provided with an upwardly directed boss of an at least partially flexible material, said boss having an upper opening narrower than a chamber defined in the boss, the chamber delimiting a space wherein an head of a male may be retained by the inwardly directed projections, wherein the upper opening of the boss is adapted to be widened by a core of a moulding tool used to define the chamber and the upper opening of the boss, when the core is extracted from the chamber through the upper opening, and is adapted to return to its original size when the core is fully ejected from the chamber, the upper opening being adapted to receive therein an insert of a substantially hard material in order to facilitate the tamper proofing of the female tag after its engagement with the male tag, wherein the boss has a sidewall extending upwardly from the female base portion that defines the chamber, and wherein the upper opening of the boss is at the an end of the sidewall that is distanced from the female base portion.

13. A female identification tag as claimed in claim 12 in which the insert is secured by welding within the upper opening of the boss.

14. A female identification tag claimed in claim 12 in which the insert is a snap-fit within the upper opening of the boss.

15. A female identification tag as claimed in claim 12 in which the base section and a radio frequency identification (RFID) component are provided as a single unit.

16. A female identification tag as claimed in claim 15 in which the RFID component is provided as an RFID coil which has been wound on a base former or bobbin.

* * * * *